United States Patent
Kuzuhara et al.

(10) Patent No.: US 9,272,448 B2
(45) Date of Patent: Mar. 1, 2016

(54) CELLULOSE RESIN FILM, PROCESS FOR PRODUCING CELLULOSE RESIN FILM, ANTIREFLECTION FILM, POLARIZING PLATE, AND LIQUID CRYSTAL DISPLAY

(75) Inventors: Noriyasu Kuzuhara, Tokyo (JP); Takashi Murakami, Tokyo (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 509 days.

(21) Appl. No.: 12/092,016

(22) PCT Filed: Oct. 19, 2006

(86) PCT No.: PCT/JP2006/320833
§ 371 (c)(1),
(2), (4) Date: Apr. 29, 2008

(87) PCT Pub. No.: WO2007/052478
PCT Pub. Date: May 10, 2007

(65) Prior Publication Data
US 2008/0246189 A1 Oct. 9, 2008

(30) Foreign Application Priority Data

Nov. 4, 2005 (JP) ................................. 2005-320798

(51) Int. Cl.
*B29C 41/28* (2006.01)
*B29C 55/08* (2006.01)
(Continued)

(52) U.S. Cl.
CPC ............... *B29C 41/28* (2013.01); *B29C 55/08* (2013.01); *G02B 5/3033* (2013.01); *B29K 2001/00* (2013.01); *B29K 2001/12* (2013.01)

(58) Field of Classification Search
USPC ........... 264/212, 288.4, 234, 235.8, 291, 299, 264/175
See application file for complete search history.

(56) References Cited

U.S. PATENT DOCUMENTS 3,254,148 A * 5/1966 Nichols ......................... 264/284
5,976,657 A * 11/1999 Min et al. ..................... 428/64.1
(Continued)

FOREIGN PATENT DOCUMENTS

CN 1204169 C 6/2005
JP 449840 5/1969
(Continued)

OTHER PUBLICATIONS

Design Engineering Manual, 1st ed. Burlington, MA, Butterworth-Heinemann, 2010. pp. 496-498.*
(Continued)

*Primary Examiner* — Stella Yi
(74) *Attorney, Agent, or Firm* — Lucas & Mercanti, LLP

(57) ABSTRACT

A cellulosic resin film which is wide and, despite this, is extremely reduced in breakage during a stretching step; a process for producing the film; and an antireflection film, a polarizer, and a liquid-crystal display each comprising or employing the film. The process for cellulosic resin film production comprises casting a liquid cellulosic resin on a support to form a web, peeling the web from the support, subsequently drying the web in a first edge gripping step (105) while gripping both edges, temporarily eliminating the edge gripping, and then stretching both edges in the width direction in a second edge gripping step (109). The process is characterized in that the first edge gripping step is followed by a heat treatment step in which both edge parts of the web relieved from the edge gripping are heated with heating rolls (107 and 108).

11 Claims, 4 Drawing Sheets

(51) Int. Cl.
*G02B 5/30* (2006.01)
*B29K 1/00* (2006.01)

(56) References Cited

U.S. PATENT DOCUMENTS

| | | | |
|---|---|---|---|
| 7,768,608 B2* | 8/2010 | Ichihashi et al. | 349/118 |
| 2003/0020208 A1* | 1/2003 | Tasaka et al. | 264/217 |
| 2003/0067091 A1* | 4/2003 | Krumm et al. | 264/284 |
| 2006/0138694 A1* | 6/2006 | Biernath et al. | 264/210.2 |
| 2008/0075894 A1* | 3/2008 | Otoshi et al. | 428/1.6 |

FOREIGN PATENT DOCUMENTS

| | | | |
|---|---|---|---|
| JP | 5080367 | | 6/1975 |
| JP | 54100469 | | 8/1979 |
| JP | 58208018 | | 12/1983 |
| JP | 06-262676 | * | 9/1994 |
| JP | 6-262676 | | 9/1994 |
| JP | 6262676 | | 9/1994 |
| JP | 2001315147 | | 11/2001 |
| JP | 2002-363341 | | 12/2002 |
| JP | 2003-294944 | * | 10/2003 |
| JP | 2003294944 | | 10/2003 |
| JP | 2004-170592 | | 6/2004 |
| JP | 2005161619 | | 6/2005 |

OTHER PUBLICATIONS

Taiwanese Office Action for Patent Application No. 095140442.
English translation of Taiwanese Office Action for Patent Application No. 095140442.
Japanese Office Action mail date: Aug. 9, 2011 (2 pages) with English language translation thereof (3 pages).

* cited by examiner

CELLULOSE RESIN FILM, PROCESS FOR PRODUCING CELLULOSE RESIN FILM, ANTIREFLECTION FILM, POLARIZING PLATE, AND LIQUID CRYSTAL DISPLAY

This is a U.S. National Phase Application under 35 U.S.C. 371 of International Application PCT/JP2006/320833 filed on Oct. 19, 2006.

This Application claims the priority of Japanese Application No. 2005-320798, filed Nov. 4, 2005, the entire content of which is hereby incorporated by reference.

TECHNICAL FIELD

The present invention relates to a cellulose resin film, a cellulose resin film producing method, an antireflection film, a polarizing plate, and a liquid crystal display, in particular, relates to a method of producing a cellulose resin film which is for example a wide film not less than 1.7 m wide, however, is reduced remarkably to cause fracture in a stretching process.

BACKGROUND ART

Various display units, such as a liquid crystal display, a plasma display (PDP), an organic EL display have been developed, and those screen sizes has been enlarged more and more. For example, in the fundamental constitution of a liquid crystal display, a polarizing plate is provided in one side or both sides of a liquid crystal cell. Since the polarizing plate allows only light having polarized wavefront with the specified direction to pass through, the polarizing plate bears an important role to visualize change of the orientation caused by an electric field in a liquid crystal display. Therefore, the performance of the liquid crystal display may be greatly influenced by the performance of the polarizing plate.

In the general constitution of the polarizing plate, for example, a protection film or a retardation film made of a cellulose ester films such as a cellulose triacetate film is pasted with an adhesive like a polyvinyl alcohol onto one side or both sides of a polarizer made of a polyvinyl alcohol film which has been uniaxially stretched and dyed with iodine. Furthermore, this polarizing plate is pasted on a liquid crystal cell with an adhesion layer.

A large-sized polarizing plate has been required with the enlargement of the screen of the above-mentioned display unit. However, when it was going to extend the width of the above-mentioned cellulose ester film used for this polarizing plate, it turned out that fracture failure takes place easily. Especially, in a widthwise stretching device called a tenter, when it is going to stretch a film with high draw ratio (draw or stretching magnification), in many cases, fracture takes place at the grasped portion of film width end portions by such as a clip and a pin of a tenter device, or the clip and the pin are disengaged from the grasped portion to cause manufacture failure. Therefore, a method of performing certainly widthwise grasping by a clip, a pin, etc. in the tenter device has been requested.

In order to prevent fracture, it may be considered that it is effective to make a stretching stress smaller. Usually, if a film is stretched on the condition that a solvent is remaining in the film formed by the solution casting film forming method, a stretching stress can be reduced. However, with this method, a portion of a film near the grasped portion becomes also soft, there may be a case where fracture increased on the contrary. To counter this, a method of making it hard to cause fracture by making the volatile component content in the film at the grasped portion smaller than that in the film at the central portion (for example, refer to Patent Document 1).

However, when the amount of remaining solvents at the ends of a film was reduced, there was a problem that curl at the ends of the film became larger to make it difficult to insert the film in a grasping tool.

Patent document 1: Japanese Patent Unexamined Publication No. 2002-127245

DISCLOSURE OF THE INVENTION

Problem to be Solved by the Invention

Therefore, the object of the present invention is to provide a producing method of a cellulose resin film which is wide, however, is reduced remarkably to cause fracture in a stretching process. Further, the cellulose resin film produced in the above way is reduced remarkably to cause fracture in a stretching process even if it is a wide film not less than 1.7 m wide, whereby the present invention makes it possible to provide efficiently a liquid crystal display device larger than 70 type with the thus produced polarizing plate.

Means for Solving the Problem

The above-mentioned theme of the present invention can be attained by the following configuration.

The invention described in item 1 is a producing method of a cellulose resin film in which a liquid state cellulose resin is cast on a support to form a web, the web is separated from the support, subsequently, the web is dried while being grasped both edges of the width thereof in the first widthwise grasping process, then the widthwise grasping is released once, thereafter further the both edges of the web is stretched widthwise in the second widthwise stretching process, the producing method of a cellulose resin film is characterized in that the method comprises a heat treatment process to heat the both edges of the web released from the widthwise grasping after the first widthwise grasping process with a heating roller.

The invention described in item 2 is the producing method of a cellulose resin film described in item 1, characterized in that the method has a slitting process to slit the both edges of the web before the heat treatment process after the first widthwise grasping process.

The invention described in item 3 is the producing method of a cellulose resin film described in item 1 or 2, characterized in that the heating roller is a heating embossing roller.

The invention described in item 4 is the producing method of a cellulose resin film described in any one of items 1 to 3, characterized in that the second widthwise grasping process grasps the heat treatment applied sections at the both edges of the web with a grasping tool.

The invention described in item 5 is the producing method of a cellulose resin film described in any one of items 1 to 4, characterized in that the second widthwise grasping process grasps inner portions in close proximity of respective heat treatment applied sections at the both edges of the web with the grasping tool.

The invention described in item 6 is the producing method of a cellulose resin film described in item 1, characterized in that the method comprises a drying process between the first widthwise grasping process and the second widthwise grasping process.

The invention described in item 7 is the producing method of a cellulose resin film described in item 1, characterized in that the first widthwise grasping process grasps the web separated from the support and stretches the web with a widthwise draw ratio of 0.95 to 1.5 times, then the web is released once from the widthwise grasping and dried in a roller conveying process, and the second widthwise grasping process stretches again the web widthwise 1.2 to 2.0 times.

The invention described in item 8 is the producing method of a cellulose resin film described in item 7, characterized in that the widthwise draw ratio in the first widthwise grasping process is 0.95 to 1.1 times and the widthwise draw ratio in the second widthwise grasping process is 1.2 to 1.5 times.

The invention described in item 9 is the producing method of a cellulose resin film described in any one of items 1 to 8, characterized in that the method comprises a wind-up process to wind up the web after the heat treatment process, wherein the second widthwise grasping process unwinds the web wound-up in the wind-up process and grasps the both edges of the web.

The invention described in item 10 is the producing method of a cellulose resin film described in any one of items 1 to 9, characterized in that a cellulose ester film having a width of 1.7 m to 4.0 m is produced from the web after the second widthwise grasping process.

The invention described in item 11 is the producing method of a cellulose resin film described in item 10, characterized in that a cellulose ester film having a width of 1.95 m to 3.0 m is produced.

The invention described in item 12 is the producing method of a cellulose resin film described in any one of items 1 to 11, characterized in that the cellulose ester film has a thickness of 10 μm to 60 μm.

The invention described in item 13 is a cellulose resin film characterized by being produced by the producing method of a cellulose resin film described in any one of items 1 to 12.

The invention described in item 14 is an antireflection film characterized by comprising the cellulose resin film described in item 13 and an antireflection layer provided on the cellulose ester film.

The invention described in item 15 is the antireflection film described in item 14, characterized in that the antireflection layer includes hollow silica particles.

The invention described in item 16 is a polarizing plate characterized by employing the cellulose resin film described in item 13 at least one side of a polarizing film.

The invention described in item 17 is a liquid crystal display device characterized by employing the polarizing plate described in item 15 at least one side thereof.

EFFECT OF THE INVENTION

According to the invention, it is possible to provide a method of producing a cellulose resin film which is a wide film, however, is reduced remarkably to cause fracture in a stretching process. Further, the cellulose resin film produced in the above producing method is reduced remarkably to cause fracture in a stretching process even if it is a wide film not less than 1.7 m wide, whereby it is possible to provide efficiently a polarizing plate and a liquid crystal display device larger than 70 type by the use of it.

EXPLANATION OF REFERENCE SYMBOL

Figure 1:
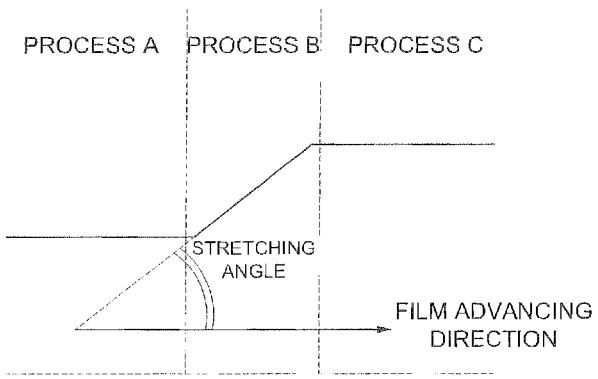
FIG. 1 shows one example of a stretching process (also referred to a tenter process) to produce a cellulose resin film according to the invention.

1 Web
2 Grasping starting point
3 Grasping tool (clip)
4 Preheating zone
5 Stretching zone
6 Holding/easing zone
7 Cooling zone
8 Grasping ending point
9 Temperature buffering zone
10 Advance side rail
11 Return side rail
12 Grasping tool temperature control means
20 Holding section
22 Grasping section
23 Heated section
101 Casting support
102 Die
103 Separating roller
104 web
105 First widthwise grasping process
106 Slitting section
107 Embossing roller
108 Back roller
109 Second widthwise grasping process
110, 110' Web dryer roller
112, 112' Wind-up roller

BEST MODE FOR CARRYING OUT THE INVENTION

Hereinafter, the best mode for carrying out the invention will be described in detail, however, the present invention is no limited these modes.

The inventor found to be able to obtain a cellulose resin film which is wide, however, is reduced remarkably to cause fracture in a stretching process by a producing method of a cellulose resin film, as a preferable embodiment, in which a dope including a cellulose resin and an organic solvent is cast on a support to form a web, the web is separated from the support, subsequently, the web is dried while being grasped both edges of the width thereof in the first widthwise grasping process, then the widthwise grasping is released once, thereafter further the both edges of the web is stretched widthwise in the second widthwise stretching process, the producing method of a cellulose resin film is characterized in that the method comprises a heat treatment process to bring a heating roller in contact with the both edges of the web released from the widthwise grasping after the first widthwise grasping process.

The film producing method of the present invention is preferably applied a cellulose resin film having a width of 1.7 m or more, more preferably 1.7 m to 4.0 m, still more preferably 1.95 m to 3.0 m.

Conventionally, it has been know that in the case where a wide cellulose resin film like the above is produced, a stretching operation is conducted separately several times by a multi stage stretching technique. However, since stretching operations at the second time or later stretches mainly with heat on the condition that the remaining solvent is too little, the stretching force is apt to concentrate at widthwise grasped portions, and fracture easily takes place due to the occurrence of twist and deformation. As a result of investigating carefully the above problem, the inventor found that a widthwise grasped portion of a film is provided with a heat treatment applied portion by being brought in contact with a heating roller and the film is grasped at the heat treatment applied portion or in the vicinity of the heat treatment applied portion, whereby fracture trouble can be reduced remarkably, and the inventor achieved the present invention. Further, when the film is brought in contact with the heating roller, a heat hardening of the film end portions is advanced, whereby the film is easily stably inserted in the grasping tool.

Hereafter, the present invention will be explained in detail.

In the present invention, the solution in which cellulose resin is dissolved in an organic solvent is called dope.

First, a film producing method of a cellulose resin film by a solution casting film forming method according to the present invention will be explained. Here, the cellulose resin is also referred to cellulose ester below.

(1) Dissolving process: this is a process of dissolving cellulose resin in an organic solvent composed of mainly a good solvent for the cellulose resin while agitating them in a dissolving tank and forming dope. In the dissolving, there are various dissolving methods such as a method of performing under ordinary pressure, a method of performing below the boiling point of the main solvent, a method of performing under a condition pressed above the boiling point of the main solvent, a method of performing with a cooling dissolving method, and a method of performing under a high pressure. After being dissolved, the dope is filtered with a filtering medium and degassed, and then sent to the next process by a pump.

In the dope, it is desirable to add a plasticizer, an ultraviolet absorber, an antioxidant, fine particles, a dye, etc which are mentioned later. These compositions are added with cellulose resin and a solvent at the time of preparing a solution, or during the preparation of the solution or after the preparation. For use in a liquid crystal display unit, it is desirable to add a plasticizer, an antioxidant, and an ultraviolet inhibitor which provide a heat-resistant and a moisture resistance.

In addition to above-described additives, inorganic particles such as kaolin, talc, diatomaceous earth, quartz, calcium carbonate, barium sulfate, titanium oxide and alumina; salt of alkali earth metal such as calcium and magnesium may be added as a thermal stabilizer. Further, such as an antistatic agent, a non-flammable agent, lubricant and oil agent may be also added.

A process of preparing a dope is further stated, that is, a higher content or concentration of cellulose resin in the dope is preferable since the load of the drying process following the flow-casting process on a metal support is reduced, however, if the concentration of cellulose resin is too high, the load of the filtration becomes larger and filtration accuracy becomes worse. Preferable content of cellulose resin to satisfy the both is from 10 to 35 percent by weight and more preferably from 15 to 25 percent.

A solvent used in the dope of the present invention may be used alone, however, two or more solvents may also be used together. A mixture of a good solvent for cellulose resin and a poor solvent is more preferably used to increase manufacturing efficiency. A mixed solvent being rich in a good solvent is preferable to increase solubility of the cellulose resin. The preferable mixing ratio is from 70 to 98 percent by weight of a good solvent, and from 2 to 30 percent of a poor solvent. Herein, the good solvent is defined as being capable of dissolving cellulose resin with a single use, and a poor solvent as swelling or being incapable of dissolving cellulose ester with a single use. Sometimes, a solvent works as a good solvent of a cellulose ester, and sometimes as a poor solvent depending on the acetification degree (degree of acetyl substitution) of the cellulose ester. For example, acetone becomes a good solvent for an acetic ester of a cellulose resin of which the acetification degree is 2.4, as well as for a cellulose acetatepropionate, however, it becomes a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the process of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

(2) Flow-casting process: This is a process of feeding a dope to a pressure die through a pressure type metering gear pump, and casting the dope at a flow casting position from the pressure die onto a casting support (hereafter, merely referred to a support) of an endless metal belt which can move infinitely or a rotating metal drum. Here, the surface of the casting support is made to a mirror surface. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these may be favorably employed. In order to increase the casting speed, two or more pressure dies may be provided on the flow casting support, the dope amount may be divided and multi-layered. Further, with a co-casting, the cast dope film may be made in a laminated layer structure in which the composition of each layer may be different from each other.

(3) Solvent vaporizing process: This is a process of heating a web (a cast film is called a web after the dope was cast on the flow-casting support) on the flow-casting support and vaporizing solvent until the web becomes separable from the support. Methods of vaporizing or evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined.

(4) Separating or Peeling process: This is a process of separating at a separating position a web in which the solvent has been evaporated on the support. The separated web is sent to the drying process. At the time of separating, if the amount of remaining solvent in the web is too much, it may be difficult to separate the web. On the contrary, when the web is separated after it was fully dried on the support, a part of the web may be separated on the way before the separating position.

In order to keep a good flatness of a cellulose resin film, it is generally preferable that when the web is separated from the metal support, the remaining solvent amount is 10 to 150 percent by weight, more preferably 20 to 40 percent by weight or 60 to 150 percent by weight, and still more preferably 20 to 30 percent by weight or 70 to 120 percent by weight. Further, the temperature at the separating point on the metal support is preferably made −50 to 40° C., more preferably 5 to 40° C., still more preferably 10 to 30° C.

The remaining solvent amount used in the present invention is expressed by the formula below.

$$\text{Remaining solvent amount (percent by weight)} = \{(M-N)/N\} \times 100$$

In the formula, M represents the weight of a web at an arbitrarily selected time point and N represents the weight of the web when the web (M) is dried for 1 hour at 115° C.

Since a web extends to a longitudinal direction (it is also called a lengthwise direction) with a separating tension and subsequently a conveying tension when exfoliating from the above-mentioned metal support, when separating the web from the metal support, it is desirable in the present invention to perform it on the condition that the separating tension and the conveying tension are weakened as far as possible. Concretely, for example, it is effective to make them 50 to 170 N/m or less. At this time, it is desirable to apply a cold wind of 20° C. or less to a web so as to fix the web quickly.

(5) Drying process: this is a process of drying a web by the use of a drying apparatus to convey the web so as to pass zigzag-arranged rollers alternately and/or a tenter device to convey the web while clipping both edges of the web with clips. Although it is general to blow hot wind to both sides of a web as the drying means, there is also a means to heat by applying microwave instead of a wind. An excessive rapid drying tends to spoil the flatness of the finished film. It is good to start drying with high temperature from the condition that a remaining solvent is 8% by weight or less. All over the whole, usually the drying temperature is 40 to 250° C. and preferably 70 to 180° C. The drying temperature, the amount of drying winds, and the drying time may differ depending on a used solvent, and dry conditions may be suitably selected in accordance with a kind of a used solvent and a combination of solvents.

In the drying process after the web was separated from the surface of the support for casting, the web tends to shrink into a width direction due to the evaporation of a solvent. As the web is dried rapidly at high temperature, the web shrinks greatly. To dry the web while preventing this shrink as far as possible is preferable to make the flatness of the finished film very well. From the view point of this, as disclosed in Japanese Patent Unexamined Patent publication No. 62-46625, the method (tenter type) of drying a web while widthwise holding the both edges of the web with clips in the entire process of a drying process or a part of the drying process is preferable.

The present invention is a cellulose resin film producing method which dries a web separated in a separating process in a drying process including a process to dry the film while widthwise grasping the web with a tenter in the first widthwise grasping process, releases the widthwise grasping once, thereafter, stretches the web widthwise in the second widthwise grasping process, the method is characterized in that after the first widthwise grasping process, there is provided a heat treatment processing section to bring a heating roller in contact with the both edges of the film which is released from the widthwise grasping. The first widthwise grasping process and the second widthwise grasping process may be conducted continuously or the web is wound up once after the first widthwise grasping process and then is wound out to the second widthwise grasping process.

An example of the stretching process (it is also called a tenter process) for producing the cellulose resin film according to the present invention will be explained with reference to FIG. 2.

Figure 2:
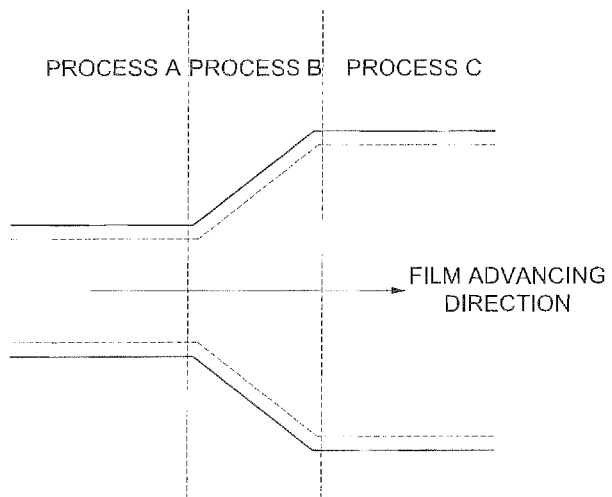
FIG. 2 shows one example of a stretching process (also referred to a tenter process) to produce a cellulose resin film according to the invention.

In FIG. 2, the process A is provided to grasp the web having been conveyed from the web conveyance process D0 (not illustrated). In the following process B, the film is drawn along the width (perpendicular to the film traveling direction) or widthwise stretched at the draw angle illustrated in FIG. 1. In the process C, the stretching terminates, and the web is conveyed while being grasped.

A slitter which trims both edges of the film is preferably provided at any position between just after the web is separated and just before Process B and right after process C.

In a tenter process, it may be preferable to provide purposely different temperature zones in order to improve the orientation angle distribution. Also a neutral zone is preferably provided between two different temperature zones to prevent interference between these zones.

In the present invention, it may be preferable to conduct stretching such that the web separated from the above-mentioned support is stretched with widthwise draw magnification of 0.95 to 1.50 times in the first widthwise grasping process, thereafter, the web is released from the widthwise grasping once and dried on a roller conveying process, and then the web is stretched with a widthwise draw magnification of 1.2 to 2.0 times by hot stretching in the second widthwise grasping process. Further, it may be preferable that the widthwise draw magnification in the first widthwise grasping process is 0.95 to 1.10 times, and the widthwise draw magnification in the second widthwise grasping process is 1.20 to 1.50 times In this way, in order to obtain the effect of the present invention, it is necessary to convey a web separated from a metal support while drying the web and to conduct widthwise stretching by the tenter method to grasp the both edges of the web with a pin or a clip, whereby a wide film having a desired retardation can be produced. At this time, the web may be stretched only to a width direction, or may be stretched into two axes (tow directions) simultaneously.

In the present invention, it is desirable to stretch the web separated from a support in the first grasping process while the amount of remaining solvent in the web is in the range of 5 to 50% by weight. If the amount of remaining solvents in the web is too much, the effect of the stretching may not be acquired, on the other hand, if it is too small, the stretching may become remarkably difficult, and fracture of a web may occur. Moreover, if a draw magnification is too small, sufficient retardation characteristics may not be obtained, on the other hand, if it is too large, the stretching may become difficult and a fracture may occur. Here, in order to obtain proper retardation characteristics, the amount of remaining solvent at the time of finishing the first grasping process is preferably in the range of 3 to 50% by weight, and more preferably in the range of 5 to 30% by weight.

If the stretching temperature in the first grasping process and the second grasping process is too high, a plasticizer may be vaporized, and if it is too low, a stretching stress may become too large, the web may become easy to cause fracture, therefore the stretching temperature is desirably in a range of 70-160° C. Especially, in the second grasping process, it is desirable that an amount of remaining solvent is 1% or less, the stretching temperature is in a range of (Tg−30) to (Tg+10)° C. for a glass transition point temperature Tg of this film, effectively in a range of (Tg−30) to (Tg−1)° C., more preferably 100 to 160° C., still more preferably 140 to 160° C.

In order to make the above mentioned orientation angle distribution better, the temperature increasing rate of the web in Process B is preferably 0.5 to 10° C./S.

The stretching time period in Process B is preferable a short time period. Concretely, it may be preferable 1 to 10 seconds, more preferably 4 to 10 seconds.

In the tenter process, a coefficient of heat transfer may be constant or may be changed. The heat transfer coefficient is preferably in the range of $41.9 \times 10^3$ to $419 \times 10^3$ J/m² hr, more preferably $41.9 \times 10^3$ to $209.5 \times 10^3$ J/m²hr, and further more preferably $41.9 \times 10^3$ to $126 \times 10^3$ J/m²hr.

The stretching rate in the transverse direction in Process B may be constant or may be changed. The stretching rate is preferably in the range of 50 to 500%/minute, more preferably 100 to 400%/minute, and most preferably 200 to 300%/minute.

In Process B, it may be preferable to control stress in initial 10 cm in order to obtain the effect of the present invention, more preferable to control it within a range of 100 to 200 N/mm.

In the tenter process, the distribution of environmental temperature is preferably smaller to improve uniformity of a film. The distribution of environmental temperature in the tenter process is preferably within ±5° C., more preferably within ±2° C., and most preferably within ±1° C. By decreasing the distribution of environmental temperature, the temperature distribution in the transverse direction of a web may also be decreased.

In Process C, it may be preferable to relax or ease widthwise the web. Specifically, it may be preferable to adjust the width to 95 to 99.5% of the final width after being stretched in the former process.

Furthermore, a concrete example of the tenter device used for the first widthwise grasping process and the second widthwise grasping process is explained with reference to the drawing.

Figure 3:
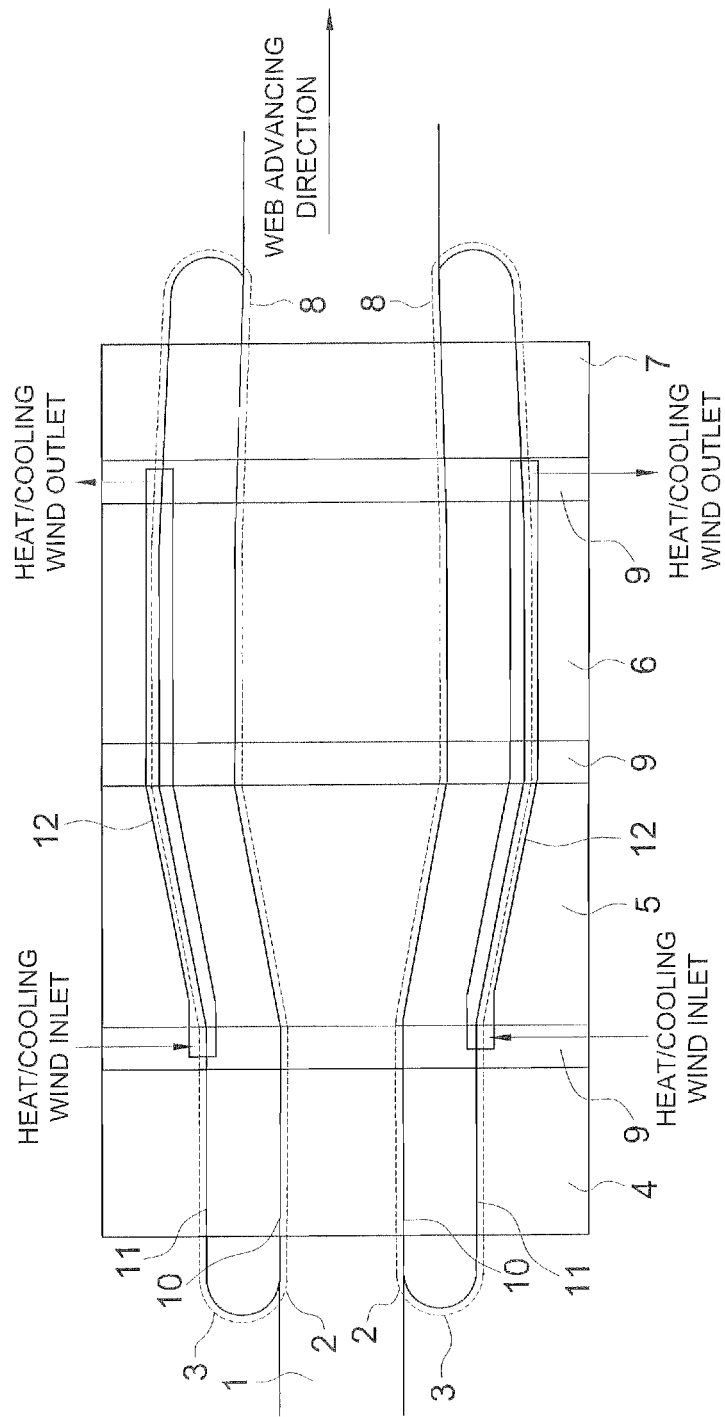
FIG. 3 is a schematic view of a tenter preferably used in the invention.

FIG. 3 is a schematic diagram of the tenter preferably used for the present invention.

The web 1 separated from a support is grasped at its both edges by a grasping tool 3 at the grasping starting point 2 of a tenter. The web 1 is preheated if needed in a preheating zone 4, and stretched widthwise or in a transverse direction in a stretching zone 5. Subsequently, the web 1 passes through a holding/easing zone 6 if needed, is cooled in a cooling zone 7, and is released from the grasping tool in a grasping ending point 8. An easing operation or a relaxing operation to narrow the width of a width direction can be performed if needed in a holding/easing zone 6 and/or the cooling zone 7. In order to maintain the independency of temperature control between each zone, it is desirable to provide the temperature buffer zone 9 between each zone. The grasping tool advances along an advancing side rail 10 from the grasping starting point 2 to the grasping ending point 8, then the grasping tool returns along a returning side rail 10 to the grasping staring point 2. In the course of the return side rail 11, the grasping tool is adjusted by a grasping tool temperature control means 12 so as to become within a predetermined temperature range at the grasping starting point 2. It is desirable that the grasping tool comprises a heating/cooling means in order to prevent fracture at the time of stretching.

The control of refractive indexes nx, ny, and nz of a film (representing a refractive index of the in-plane slow axis direction, a refractive index of the direction perpendicular to the above direction, and a refractive index of the thickness direction, respectively) may be conducted by making the web to stretch or shrink in a lengthwise direction in addition to the above-mentioned widthwise stretching condition. The draw magnification in the lengthwise direction may be preferably in a range of 0.8 to 1.1 times. In order to stretch or shrink in the lengthwise direction, it can be conducted by the use of a simultaneous 2 axis stretching device to make the interval of a pin or a clip of a tenter in the conveying direction (lengthwise direction) larger (wider) or shorter (narrow). If the clip portion is driven by a linear drive type, the stretching can be conducted smoothly. Therefore since danger, such as a fracture, can be reduced, the linear drive type is desirable. Moreover, as a method of stretching in the lengthwise direction, a method of giving rotation speed differences among plural rollers and of stretching in the lengthwise direction by utilizing the rotation speed difference can also be used.

The present invention is characterized in that after the above-mentioned first widthwise grasping process was finished, a heat treatment process brings a heating roller in press contact with the both edges of a film so as to provide heat treatment-applied portions on the both edges, and thereafter the second widthwise grasping process grasps these heat treatment-applied portions or the neighborhood of these parts. Furthermore, after the above-mentioned first widthwise grasping process was finished, it is desirable to slit the both edges of the film which was released once from the widthwise grasping, and thereafter to perform the heat treatment process. Moreover, as the heating roller used in the heat treatment process, a heating embossing roll provided with convexo-concave on its surface may be used preferably.

The slitting process for the both edges of a film is so called "ear-cut", is a process to cut out portions grasped with a clip or a pin, and is performed by a cutting device to cut out a film into a predetermined size. The cutting device is constituted by a cutting position determining means to determine a cutting position and a cutting unit having a cutting blade. Although the cutting position determining means is not limited specifically, it can use a CCD camera, a photo sensor, etc., for example.

The film to which the slitting process has been performed moves to the heat treatment process to bring a heating roller in press contact with the film so as to provide heat treatment-applied portions.

The heat treatment-applied portions of the present invention are parts on both edges of a web which was stretched and dried in the first widthwise grasping process, wherein the parts were pressed with the heating roller respectively in the heat treatment process When a heating embossing roll is used especially, the parts are provided with a thicker layer band or a convexo-concave-shaped band so as to become protruded. parts higher than the surface of a film base material. The shape of concavo-convex is not limited specifically, but concavo-convex having various patterns may be used. The area ratio of parts observed as lines of the protrusion in embossed parts to the whole embossed parts is preferably 15 to 50%. In the case where the protrusion included in one line is discontinuous protrusions, the number of the discontinuous protrusions is preferably 10 to 30.

As a method of giving convexo-concave, the convexo-concave can be formed such that the embossing roll is heated higher than the glass transition point (Tg) of a film and lower the melting point (Tm) and is brought in press contact with the film. It is desirable to press an embossing roll heated to 120 to 270° C. preferably. Since fine convexo-concave are formed on the embossing roll, convexo-concave can be formed on a film by a process of pressing this on the film, and end portions can be made bulky or protrusions. The thickness of the heat treatment-applied portions in the present invention means the thickness from the surface of a film to the top of convex parts of the embossed parts. This thickness can be attained by the use of an embossing roll on which convexo-concave are shaped so as to provide a desired height of convex parts at the stage of producing this embossing roll.

Although the width of the heat treatment-applied portions in the width direction of the film does not have any limitation in particular, it may be 0.5 cm to 3 cm, preferably 1 to 2.5 cm, more preferably 1.5 to 2 cm in width. Also, although the position of the heat treatment-applied portions is not limited specifically, it is desirable that heat treatment processing is applied to portions located 0 to 50 mm from the side end of film.

In order to obtain the effect of the present invention, it is more desirable than the thickness of the heat treatment-applied portions is thicker from 5 μm to 30 μm than the thickness of a film. Preferably, it is thicker from 10 μm to 20 μm. When the thickness of the heat treatment-applied portions is 5 μm or more, it becomes possible to widthwise gasp the film with a clip and a pin. On the other hand, when it is more than 30 μm, it may be difficult to produce an emboss roll for it.

Figure 4:
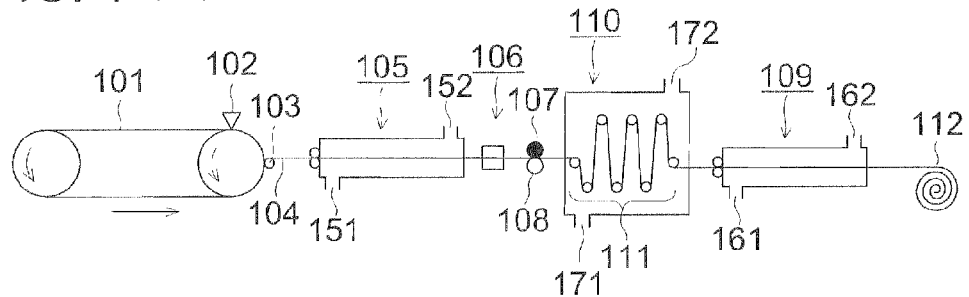
FIGS. 4(a) and 4(b) each are an outlined view showing a production flow of a cellulose resin film according to the invention.
Figure 4:
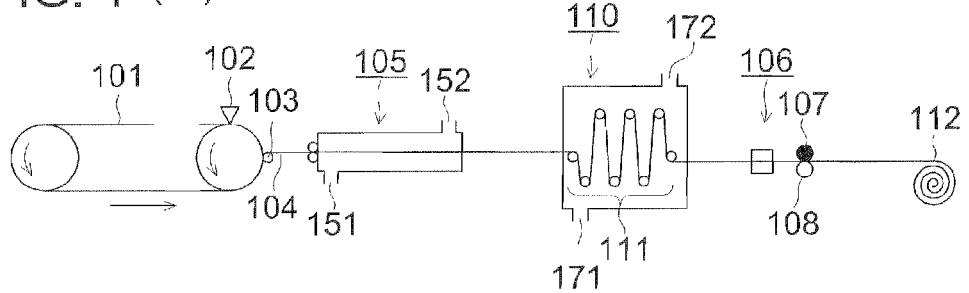
Figure 4:
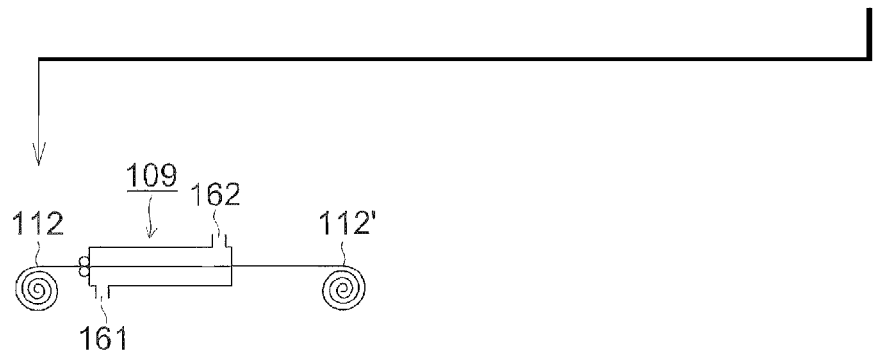

FIG. 4 is a schematic diagram of a production flow of cellulose resin film according to the present invention.

FIG. 4(a) shows a process in which a stretching operation is performed continuously in the following way. A dope is cast from a die 102 onto an endless casting support 101, and, a web 104 is separated with a separating roll 103, and the widthwise both edges of the web 104 is grasped by the first widthwise grasping process 105 In the first widthwise grasping process 105, temperature-controlled dry winds are blown into from a dry wind intake 151, and the dry winds are discharged from an outlet 152. Subsequently, ear-cut of end portions of the web 104 is performed by a slitting process 106, desired heat treatment-applied portions are formed by a heated embossing roll 107 and a back roll 108 placed opposite to the heated embossing roll 107, and widthwise stretching is conducted for the web 104 by a second widthwise grasping process 109, The stretched web is conveyed further and is rolled round as a wound-up roll 112.

In FIG. 4(b), the widthwise both edges of a web 104 are grasped by the first widthwise grasping process 105 and the web 104 is dried in this first widthwise grasping process 105. After the web 104 is subjected to the slitting process and the heat treatment process, the web 104 is rolled round as a wound-up roll 112 and is stored in a warehouse. Thereafter, the web 104 is rolled out from the wound-up roll 112 and is widthwise stretched by the second widthwise grasping process. Here, although the heat treatment process to provide convexo-concave by the heated embossing roll 107 can be conducted under ordinary temperature, it is desirable to conduct it after the web 104 is dried at the first widthwise grasping process 105 as shown in FIG. 4(a). Moreover, as shown in FIG. 4(b), after the first widthwise grasping process 105, the web 104 is further dried while being conveyed with many rollers 111 in the drying process 110, and thereafter a heat treatment process can also be performed.

The second widthwise grasping process 109 conducts stretching operation for the web 104 while widthwise grasping the heat treatment-applied portions on the widthwise both edges of the web 104 formed as mentioned above. In the present invention, in order to perform the orientation of a polymer with sufficient precision, it is also desirable to use a tenter which can control a grasping length (distance from a grasping staring point to a grasping ending point) of a web independently at right and left by right and left grasping means of the tenter.

Figure 5:
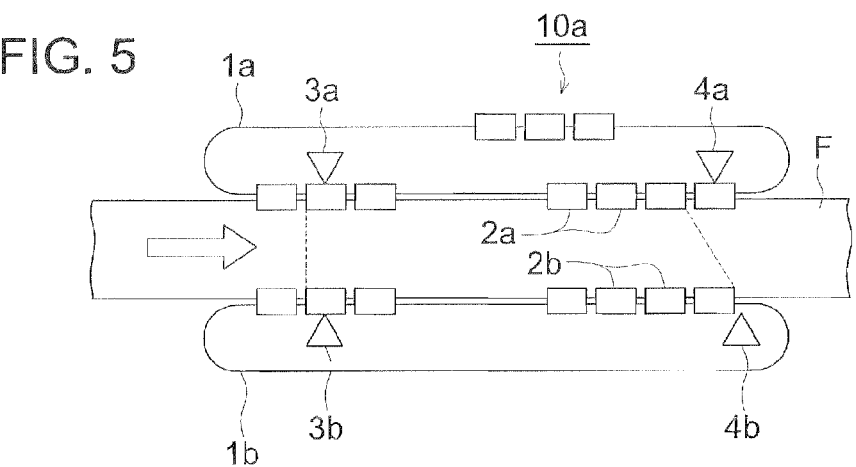
FIG. 5 is a schematic view of a tenter preferably used in the invention.

As a means to make grasped lengths of the web different at left and right edges by independently controlling the right side length and the left side length of the portions where the both right and left edges of the web are grasped in a tenter stretching apparatus, exemplified is, for example, the apparatus shown in FIG. 5. FIG. 5 shows a schematic illustration of a tenter apparatus (10a) preferably usable in the production process of the polymer film of the present invention. In this figure, by changing the grasping starting positions of the holding members (clips) (2a) (2b) at left and right, namely, by changing the set positions of the clip closers (3a) (3b) of left and right to change the holding starting positions at left and right edges, the left and right holding lengths of the film (F) are changed, whereby a force to twist the resin film (F) is generated in the tenter apparatus (10a). By the force to twist the film, the displacement occurred in the transport process other than in the tenter is corrected, and then the occurrence of meandering, tensile or wrinkle of the film can be avoided, even when the length between the separating point and the tenter becomes longer.

(Here, the grasping means at the left side of (3a) and (3b) in FIG. 5 indicates a clip immediately before grasping a web.)

Further, though the tenter stretching apparatus (10a) in the figure is schematically shown, a usual arrangement is as follows. Many clips (2a) (2b) are equipped on a pair of rotating devices arranged on left and right sides, each rotating device containing a looped chain (1a) (1b). The track of each of the left and right chains (1a) (1b) is set so that the clips moving in the forward direction of the chains, which hold the left and right edges to stretch the film, gradually draw apart from the film (F) toward the lateral direction of the film, whereby the film (F) is stretched in the lateral direction.

In order to precisely correct the wrinkle, tensile, and displacement, a device which avoids the meandering of the long roll film is preferably equipped. It is preferable that an edge position controller (also referred to as EPC) disclosed in JP-A No. G-8663, or a center position controller (also referred to as CPC) is used to correct meandering. These devices detect the edges of the film with an air servo sensor or an optical sensor to control the transport of the film using the obtained information, whereby the edge positions and the center position of the film with respect to the lateral direction are kept constant while the film is transported. One or two guide rolls or a flat expander roll having a driving member as actuators are moved to the right and left (or up and down) along the line to correct the meandering. A pair of small pinch rolls are placed on each of the right and left of the film (one of the pair of pinch rolls is placed on the front surface of the film and the other is placed on the back surface of the film, wherein the two pairs of the pinch rolls are located on both sides of the film), whereby the film is sandwiched and pulled to correct meandering (a cross guide method). The principle of meandering correction of these devices can be described as follows: When the running film tends to move to the left, the roll is tilted so as to move the film to the right, in the former method, and in the latter method, a pair of pinch rolls on the right nip the film to pull it to the right. At least one of the aforementioned meandering preventive apparatuses is preferably installed between the separating point of the film and the tenter stretching apparatus.

In the second widthwise grasping process, when grasping the widthwise both edges of the web applied with a heat treatment with a clip of the tenter stretching device, the heat treatment-applied portions on the web applied with a heat treatment may be grasped, or inside portions of the heat treatment-applied portions on the web may be grasped. In any case, since the heat treatment-applied portions of the web are strengthened by the heat treatment, even if hot stretching is performed at the second widthwise grasping process, fracture at end portions of the web and a trouble that clips slips out from end portions of the web can be prevented.

Figure 6:
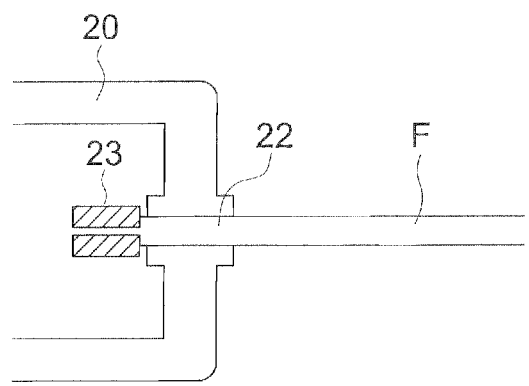
FIGS. 6(a) and 6(b) are each a schematic view showing a grasping situation in the second widthwise grasping process.
Figure 6:
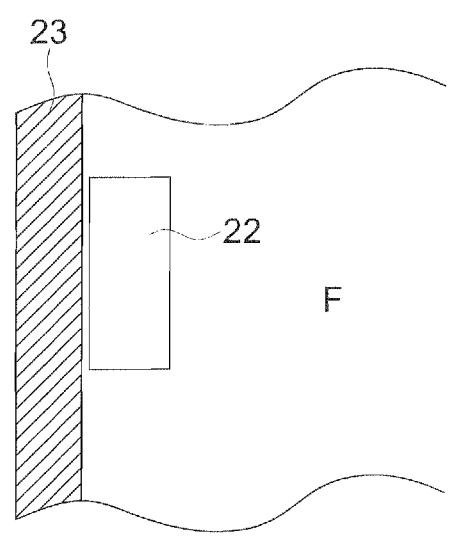

FIG. 6(a) and FIG. 6(b) show examples in which inner portions (neighborhood of heat treatment-applied portions) in close proximity of emboss section 23 (heat treatment-applied portions) on the web are grasped with a clip as a grasping tool 20. In this case, in order to grasp stably, it may be preferable to grasp neighborhood portions 22 (neighborhood of heat treatment-applied portions) of the emboss section 23.

After the second widthwise grasping process, it may be preferable to provide a post drying process (hereafter, referred merely to Process D1).

Although the film tension while the film is being conveyed is affected by several factors, for example: the property of a dope, the amount of residual solvent at the separating process and Process D0, and the temperature of Process D1, the film tension is preferably 120 to 200 N/m, more preferably 140 to 200 N/m, and most preferably 140 to 160 N/m.

In order to reduce further stretching in the machine direction of the film in Process D1, a tension cut roll is preferably provided.

A device to dry a web does not have a restriction specifically, and although it can generally carry out with a hot wind, infrared radiation, a heating roll, a microwave, etc., it is desirable to carry out by a hot wind in respect of simplicity.

The drying temperature in the drying process for a web is 100 to 200° C., and the drying process is preferably conducted at 110 to 160° C. for 10 to 60 minutes. More preferably, a heat treatment is conducted for the web at 105 to 155° C., an atmosphere replacing rate of 12 times/hours or more, preferably, the web is subjected to the heat treatment under the atmosphere with the atmosphere replacing rate of 12 to 45 times/hours while being conveyed.

Moreover, as for a cellulose resin film of the present invention, it is desirable that the free volume radius obtained by a positron annihilation lifetime spectroscopy is 0.250 to 0.350 nm, more preferably 0.250 to 0.310 nm.

The free volume in the present invention represents vacant area which is not occupied by the cellulose resin chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

(Measurement of Free Volume Radius by Positron Annihilation Lifetime Spectroscopy, and Free Volume Parameter)

A positron annihilation lifetime and relative intensity were measured under the following measurement condition.

| (Measurement Condition) | |
| --- | --- |
| Positron source: | 22 NaCl (intensity: 1.85 MBq) |
| Gamma-ray detector: | Plastic scintillator + Photomultiplier tube |
| Apparatus time resolution: | 290 ps |
| Measurement temperature: | 23° C. |
| Total number of counts: | 1 million counts |
| Specimen size: | 20 mm × 15 mm × 2 mm 20 pieces of 20 mm × 15 mm sized films were piled to prepare an about 2 mm thick |

| (Measurement Condition) | |
| --- | --- |
| | sample. The sample was dried under vacuum 24 hours. |
| Irradiation area: | A circle of about 10 mm in diameter |
| Time per channel: | 23.3 ps/ch |

According to the above measurement condition, positron annihilation lifetime spectroscopy was carried out. A three component analysis using a nonlinear least-square method was carried out for the obtained results. When the annihilation times were referred to as, in small order, τ1, τ2 and τ3 and the corresponding intensities were referred to as I1, I2 and I3 (I1+I2+I3=100%), respectively, using the largest annihilation time T3, a free volume radius R3 (nm) was determined using the following formula. The larger the T3 value is, the larger the estimated free volume is.

$$\tau 3 = (1/2)[1-\{R3/(R3+0.166)\}+(1/2\pi)\sin\{2\pi R3/(R3+0.166)\}]^{-1}$$

where, 0.166 (nm) represents the thickness of the electronic layer which is exuding from the wall of a hole.

The above measurements were repeated twice and the mean values were calculated for the determination.

Evaluation of a free volume in polymer by positron annihilation spectroscopy is explained in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20".

The free volume radius of the cellulose resin film of the present invention is preferably 0.250-0.310 nm and is more preferably 0.270-0.305 nm. The method of controlling the free volume radius of the cellulose resin in a prescribed range is not specifically limited, however, the following method may be applicable.

A cellulose resin film having a free volume radius of 0.250-0310 nm determined by positron annihilation lifetime spectroscopy may be obtained, for example, by the methods of casting a dope containing a cellulose derivative and a plasticizer to produce a web; stretching the web while the web contains solvent; drying the web until the amount of residual solvent decreases to 0.3% or less to obtain a cellulose resin film; treating the cellulose resin film at 105 to 155° C. while conveying the film under an atmosphere of the atmosphere replacement rate of not less than 12 times/h or more, or more preferably 12 to 45 times/h.

The rate of atmosphere replacement is the number of times replacing the atmosphere of a heat treatment chamber by fresh-air per unit time, provided that the volume of the heat treatment chamber is expressed as V (m$^3$) and the amount of fresh-air sent to the heat treatment chamber is expressed as FA (m$^3$/hr). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=$FA/V$(times/h)

Furthermore, in order to produce a retardation film or a polarizing plate protective film of the present invention, it is desirable to give a pressure of 0.5 kPa or more to 10 kPa or less in a thickness direction onto the film in the heat treatment process after the drying process, for example, it is desirable to apply a pressure uniformly with a nip roll. In case of applying a pressure in the thickness direction, it is desirable that drying is fully completed. Further, at this time, the free volume radius of a retardation film can be controlled by applying a pressure of 0.5 kPa or more to 10 kPa or less from both surfaces of the film. Concretely, a method of applying a pressure on a film with two parallel nip rolls may be employed. Moreover, a method like a calendar roll may be employed. At the time of pressing, a temperature is desirably 105 to 155° C.

(6) Winding-up process: This is a process of winding up the web as a film after the amount of remaining solvent becomes 2' by mass or less. A film with excellent dimensional stability can be obtained by making the amount of residual solvents into 0.4 W by mass or less. As the winding up, what is generally used may be used, for example, a constant torque method, a constant tension method, a taper tension method, a program tension controlling method of a constant internal stress, etc. may be listed, and these can be used properly.

In the embodiment of FIG. 4(a), with regard to end portions heat-treated before the second widthwise grasping process, it may be preferable to cut out the end portions by a slitter after the second widthwise grasping process before being wound up in order to obtain a good figure of a wound-up roll. Furthermore, it is desirable to conduct the above-mentioned heat treatment process to widthwise both edges of the web. On the other hand, in the embodiment of FIG. 4(b), the web is wound up without being cut out the heat treated end portions of the web and is stored in a warehouse. Therefore, in the heat treatment process, if an embossing roll 1 gives convexo-concave on the web, this convexo-concave can be utilized as emboss for winding up. After the storage in the warehouse, when the web is wound out from the wound-up roll and is applied with widthwise stretching by the second widthwise grasping process, the widthwise stretching is conducted while the heat-treated end portions or the neighborhood of the end portions are widthwise grasped. Thereafter, before being wound up again, the heat-treated end portions are cut out by a slitter, whereby a good figure of a wound-up roll of the web can be obtained.

Although the thickness of a cellulose resin film may changes depending on the purposes of use, as a finished film, the thickness is usually desirably within a range of 10 to 200 μm, more desirably within a range of 10 to 120 μm, specifically desirably within a range of 10 to 60 μm. If the thickness is too thin, the strength of a film may become weak and handling easiness of the film becomes bad. However, in the present invention, since the second widthwise grasping process is conducted after the heat treatment process, widthwise stretching can be performed even for a thin film without causing fracture. On the other hand, if the thickness is too thick, a display unit becomes thick, and for example, portability may be spoiled. The thickness is adjusted to become a desired thickness by the control of the concentration of a dope, the liquid feeding amount of a pump, a lid gap of a die, a extruding pressure of a die and the speed of a casting support. Moreover, as a means for making thickness uniform, it is desirable to employ a thickness detecting means so as to feed back programmed feedback information to each above-mentioned device to adjust the thickness.

In a solution casting film forming process from immediately after casting to drying method, although the atmosphere in a drying device may be made air, the atmosphere may be an inert gas atmosphere, such as nitrogen gas and carbon dioxide gas. However, it is a matter of course that consideration must always be taken for the danger of the explosion limit of vaporized solvent under the dry atmosphere.

Moreover, the above-mentioned cellulose resin film is separated. after casting, is dried and wound up in a rolled form, thereafter, there may be a case where the cellulose resin film is provided with a functional thin layer, such as a hard coat layer and an antireflection layer. In order to protect a cellulose resin film as a product from a soil and waste adhesion by static electricity, the cellulose resin film is usually subjected to a package process until it is processed or shipped. With regard to a packaging material, as far as the above-mentioned purpose can be achieved, it will not be limited especially, but the packaging material which does not prevent vaporization of remaining solvent from the film is desirable. Concretely, polyethylene, polyester, polypropylene, nylon, polystyrene, paper, various nonwoven fabrics, etc. are listed as the packaging material. A packaging material in which fiber became mesh cross state is used more preferably.

In the cellulose resin film according to the present invention, it is preferable that a retardation value Ro and a retardation value Rt defined by the following formula at 590 nm is within a range of 0 to 300 nm and a range of −600 to 600 nm respectively. Further, more preferably Ro is within a range of 0 to 120 nm and Rt is within a range of −400 to 400 μm, and sill more preferably Ro is within a range of 0 to 100 nm and Rt is within a range of −300 to 300 nm.

It is desirable that when the cellulose resin film of the present invention is used as a polarizing plate protective film, especially is used on an observed side surface of a polarizing plate, the cellulose resin film is a film exhibiting an optically isotropy and has a retardation value Ro and a retardation value Rt defined by the following formula is within a range of 0 to 10 nm and a range of −20 to 20 nm respectively.

Moreover, the cellulose resin film of the present invention is advantageously used also as an optical compensation film of a VA type liquid crystal display which has a liquid crystal cell with a VA mode, it may be preferable that the optical compensation film used in the VA type liquid crystal display has a Ro value of 20 to 150 nm and a Rt value of 70 to 400 nm. The Ro value is more preferably 30 to 100 nm. When two sheets of the optical compensation films are used for the VA type liquid crystal display, the Rt value of the film is 70 to 250 nm. When one sheets of the optical compensation film is used for the VA type liquid crystal display, the Rt value of the film is 150 to 400 nm.

Retardation values Ro, Rt or an angle θo (°) between a slow axis and a widthwise direction of a cellulose resin film can be measured by the use of an automatic double refractometer. The measurement of a double refractive index of a cellulose resin film is conducted by the use of an automatic double refractometer KOBRA-21ADH (manufactured by Oji Scientific Instruments) under a test environment of 23° C. and 55% RH at a wavelength of 590 nm, whereby Ro and Rt can be obtained.

$$Ro=(nx-ny)\times d$$

$$Rt=((nx+ny)/2-nz)\times d$$

(In the formulas, nx represents a refractive index of a slow axis direction, ny represents a refractive index of a fast axis direction, nz represents a refractive index of a thickness-wise direction, and "d" represents a thickness (nm) of a film.)

In the cellulose resin film obtained in the above ways, the slow axis direction of the film (the direction of the maximum refractive index in a plane of the film) preferably has an angle of +5° to a direction (a film widthwise direction) perpendicular to the winding-up direction, more preferably within an angle of ±1°, still more preferably within an angle of ±0.5°.

A water-vapor permeability of a cellulose resin film of the present invention as a value measured according to JIS Z 0208 (25° C., 90% RH) is desirably 200 g/m²·24 hours or less, more desirably 10 to 180 g/m²·24 hours or less, still more desirably 160 g/m²·24 hours or less.

The cellulose resin film of the present invention is preferably a lengthy film, concretely 100 to 10000 m long, more preferably 100 m to 5000 m long, it is preferable a film provided as a roll-shaped figure.

The cellulose resin film of the present invention has a slow axis in a film plane along the width direction of a lengthy film, and the elastic modulus $\epsilon_s$ of the slow axis direction in the film plane and the elastic modulus $\epsilon_f$ of the direction perpendicular to the aforesaid slow axis (the direction perpendicular to $\epsilon_s$) satisfy the relationship of following Formula (1).

$$1.26 \leq \epsilon_s/\epsilon_f \leq 2.60 \quad \text{Formula (1)}$$

Further, in the cellulose resin film of the present invention, the aforesaid elastic modulus, $\epsilon_s$ and $\epsilon_f$, preferably satisfy the relationship of following Formulas (2) and (3).

$$700 \leq \epsilon_s - \epsilon_f \leq 2,450 \quad \text{Formula (2)}$$

$$100 \leq (\epsilon_s + \epsilon_f) \times d \leq 500 \quad \text{Formula (3)}$$

(Here, the Unit of $\epsilon$ is MPa, the Unit of d is Mm)

When the value of Formula (1) is within a range of 1.26 to 2.60, the balance of an elastic modulus of the slow axis in a film plane and an elastic modulus of the direction perpendicular to the aforesaid slow axis will be broken to hardly cause a fracture trouble. Therefore in order to the elastic modulus of the slow axis in a film plane and the elastic modulus of the direction perpendicular to the aforesaid slow axis, it is preferable that the relationship between the both elastic modulus and the difference between the both elastic modulus preferably satisfy the ranges of Formulas (2) and (3). It may be considered that when polymer constituting a film in a stretching direction is quickly oriented, the occurrence of fine crystals of the polymer itself and additives (or crystallization), the occurrence of micro voids and micro phase separation between polymer and additives can be suppressed, whereby the fracture trouble can be suppressed.

(Cellulose Ester)

The cellulose ester usable in the cellulose resin film of the present invention is preferably a lower fatty arid ester of a cellulose. In the lower fatty acid ester of a cellulose, the lower fatty acid represents one having carbon atoms of 6 or fewer, including, for example: cellulose acetate, cellulose propionate, cellulose butyrate, and mixed fatty acid esters of for example cellulose acetatepropionate and cellulose acetate butyrate disclosed in JP-A 10-45804, JP-A 8-231761, and U.S. Pat. No. 2,319,052. Among these, as a lower-fatty-acid ester of a cellulose used especially preferably, cellulose triacetate and cellulose acetatepropionate are specifically preferable, These cellulose esters are preferably also used in combination.

In the case of a cellulose triacetate, a cellulose triacetate having an average acetylation degrees (an amount of jointed acetic acid) of 54.0-62.5% is used preferably, and especially a cellulose triacetate having an average acetylation degree of 58.0-62.5% is more desirable.

Another preferable cellulose ester besides cellulose triacetate, is one having an acyl group with from 2 to 4 carbon atoms as a substituent, and simultaneously satisfying the following formulas (1) and (II) when X represents the substitution degree of an acetyl group, while Y represent the substitution degree of a fatty acid ester group with from 3 to 22 carbon atoms:

$$2.5 \leq X+Y \leq 3.0 \quad \text{Formula (I)}$$

$$1.0 \leq X \leq 2.95 \quad \text{Formula (II)}$$

(Here, X represents the substitution degree of an acetyl group, while Y represent the substitution degree of a fatty acid ester group with from 3 to 22 carbon atoms.) Especially, cellulose acetate propionate with $1.0 \leq X \leq 2.95$ and $0.1 \leq Y \leq 2.0$ is preferable. The portions where are not substituted with an acyl group remain usually as a hydroxyl group. These esters may be synthesized by any well known method in the art.

The substitution degree of an acyl group can be measured by a method in accordance with the regulation specified in ASTM-D817-96.

Cellulose ester can be prepared using cotton linter, wood pulp or kenaf as starting materials which may be used alone or in combination. It is particularly preferable to use a cellulose ester prepared from cotton linter (hereafter described merely as linter) or from wood pulp.

If the molecular weight of a cellulose ester is large, the rate of change of an elastic modulus due to heat will become small. However, it the molecular weight is raised too much, the viscosity of a cellulose ester solution will become high too much, and a manufacturing efficiency will fall. The number average molecular weight of cellulose ester is desirably 40000 to 200000, because a mechanical strength at the time of shaping becomes strong, and a dope solution becomes proper viscosity, and more desirably 50000 to 150000. Moreover, weight average molecular weight (Mw)/number average molecular weight (Mn) is desirably in the ranges of are 1.4 to 4.5.

As an organic solvent used for preparing a dope solution, it may be desirable for the organic solvent to be able to dissolve cellulose ester and to have a moderate boiling point, for example, methylene chloride, methyl acetate, ethylacetate, amyl acetate, methyl acetoacetate, acetone, tetrahydrofuran, 1,3-dioxolane, 1,4-dioxane, cyclohexanone, ethyl formate, 2,2,2-trifluoro ethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 1,3-dimethyl-2-imidzolinon etc. may be employed, however, organic halogenated compounds such as methylene chloride; a dioxysolan derivative, methyl acetate, an ethylacetate, acetone, methyl acetoacetate, etc. may be listed up as a desirable organic solvent (namely, good solvent).

Further, as shown in the following film-production process, when drying a solvent from the web (dope solution film) formed on a casting support in a solvent evaporation process, from a viewpoint of preventing foaming in the web, as a boiling point of the organic solvent used, 30-80° C. is desirable, for example, the boiling point of the above-mentioned good solvents are methylene chloride (40.4° C. of boiling points), methyl acetate (56.32° C. of boiling points), acetone (56.3° C. of boiling points), an ethylacetate (76.82° C. of boiling points), etc.

Among the above-mentioned good solvents, methylene chloride or methyl acetate which is excellent in solubility may be used preferably.

In a dope used in the present invention, 0.1 to 40% by weight of alcohol having a carbon number of 1 to 4 is preferably added in addition to the above described organic solvent. More preferably, 2 to 30% by weight of the above alcohol is included. When alcohol is contained in a web, after casting a dope on a support and the solvent being partially evaporated from the web, the relative concentration of alcohol becomes higher and the web begins to gelate. The gelation increases the mechanical strength of the web and makes it easier to peel the web from the support. A smaller concentration of alcohol in a dope may contribute to increase a solubility of cellulose ester in a non-chlorine based organic solvent.

Typical alcohols of 1 to 4 carbon atoms (per molecule) are methanol, ethanol, n-propanol, iso-propanol, n-buthanol, sec-buthanol, and tert-buthanol.

Among these solvents, ethanol is desirable, because the stability of a dope solution is preferable, a boiling point is also comparatively low, drying characteristics are also preferable, and there is no toxicity. It is desirable to use preferably a solvent which contains ethanol 2% by mass to 30% by mass to 70% by mass to 95% by mass of methylene chloride. Methyl acetate can also be used instead of methylene chloride. At this time, a dope solution may be prepares with a cooling solution process.

The cellulose resin film of the present invention desirably contains the following plasticizers from a viewpoint of plasticity, moisture permeability, and dimensional stability. The plasticizers available to this invention are not limited particularly. However, to prevent hazes on the film and bleed-out or volatilization of the plasticizer from the film, the plasticizer should preferably contain functional groups which can react with the cellulose derivative by hydrogen bonds, etc.

Such functional groups are hydroxy, ether, carbonyl, ester, carboxylic residue, amino, imino, amide, imide, cyano, nitro, sulfonyl, sulfonic residue, phosphonyl, phosphonic residue groups. Among them, carbonyl, ester, and phosphonyl groups are preferable.

As a plasticizer used for the present invention, a phosphate ester type plasticizer and a non-phosphate ester type plasticizer are used preferably.

As a phosphate ester type plasticizer, triphenyl phosphate, tricresyl phosphate, cresyldiphenyl phosphate, octyl diphenyl phosphate, diphenylbiphenyl phosphate, trioctylphosphate, tributyl phosphate, etc. may be listed.

As a non-phosphate ester type plasticizer, a phthalate ester plasticizer, a trimellitie acid ester type plasticizer, a pyromellitic acid type plasticizer, a multivalent alcohol ester type plasticizer, a glycolate type plasticizer, a citrate ester type plasticizer, a fatty ester type plasticizer, a polyester type plasticizer, a polycarboxylic-acids ester type system plasticizer, etc. may be used preferably. However, in order to obtain the effect of the present invention, it is desirable to use a multivalent alcohol ester type plasticizer, a polyester type plasticizer, and a polycarboxylic-acids type plasticizer.

A polyalcohol ester consists of an ester of an aliphatic polyalcohol having a valence of two or more and monocarboxylic acid, and preferably includes an aromatic ring or a cycloalkyl ring in a molecule.

A polyalcohol used in the present invention is represented by formula (1)

$$R_1—(OH)_n \qquad \text{Formula (1)}$$

(Here, $R_1$ represents an organic acid having a valence of n, n represents a positive integer of 2 or more.)

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, pentaerythritol, and dipenta erythritol. Specifically, trimethylolpropane and pentaerythritol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives. Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid. Examples of preferable alicyclic monocarboxylic acids include: cyclopentanecarboxylic acid, cyclohexanecarboxylic acid, cyclooctanecarboxylic acid, and derivatives thereof. Examples of preferable aromatic monocarboxylic acids include: (i) benzoic acid and toluic acid, both of which have benzene ring in which alkyl groups are introduced, (ii) biphenylcarboxylic acid, naphthalenecarboxylic and tetralincarboxylic acid having 2 or more benzene rings, and (iii) derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester. To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups. Specific examples of polyalcohol esters are shown below:

1

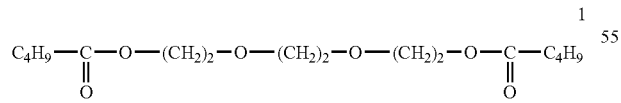

2

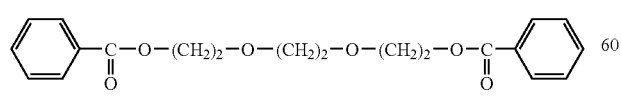

3

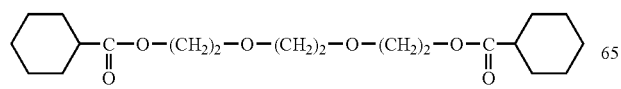

-continued

4

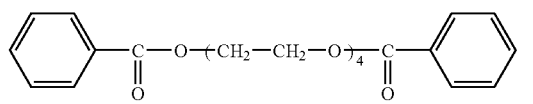

5

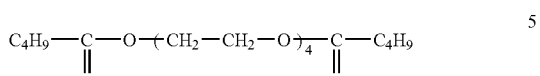

6

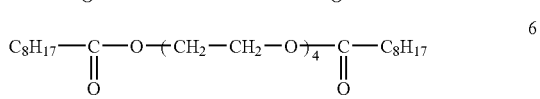

7

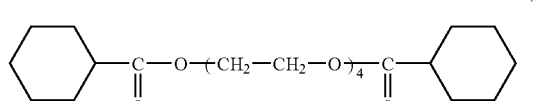

8

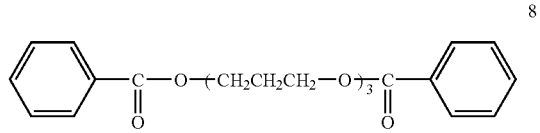

9

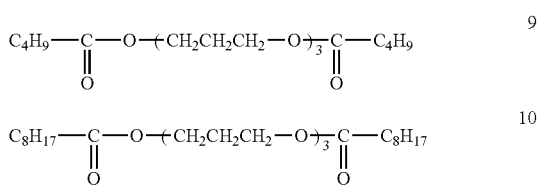

10

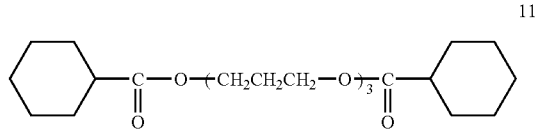

11

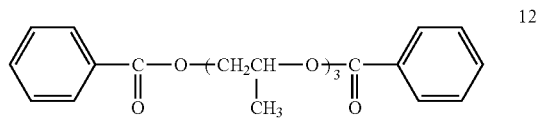

12

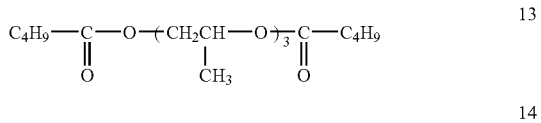

13

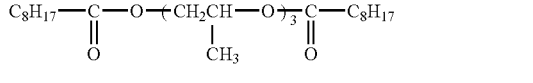

14

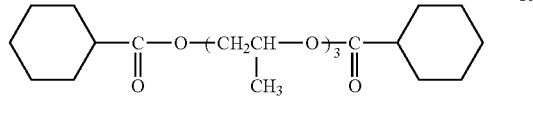

15

16

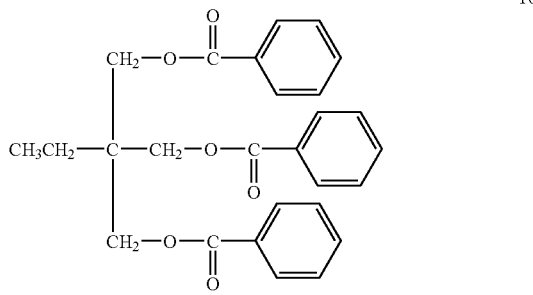

17
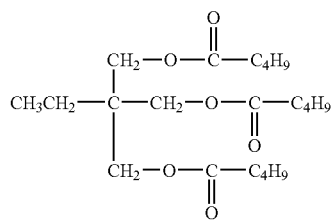
18
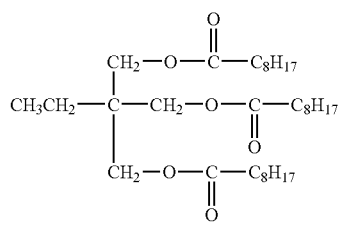
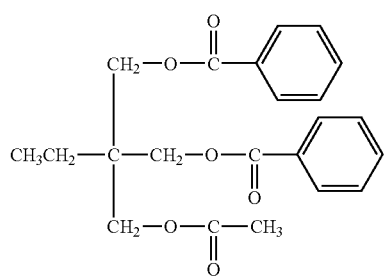
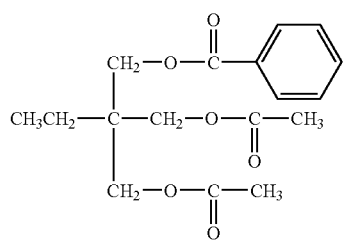
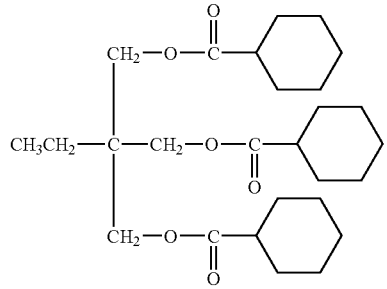
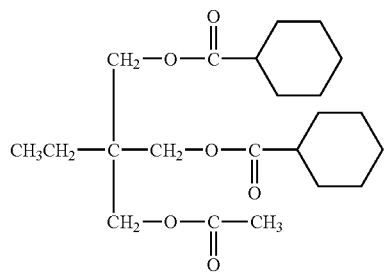
23
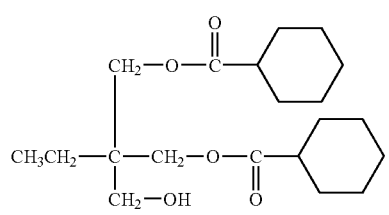
24
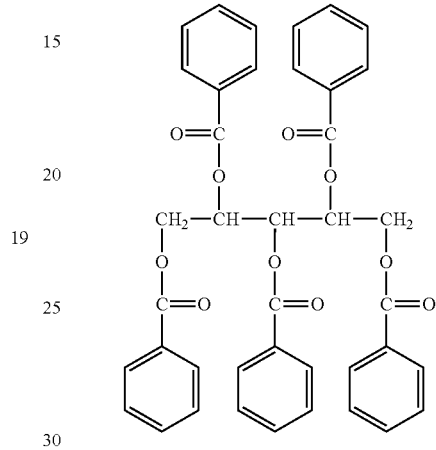
25
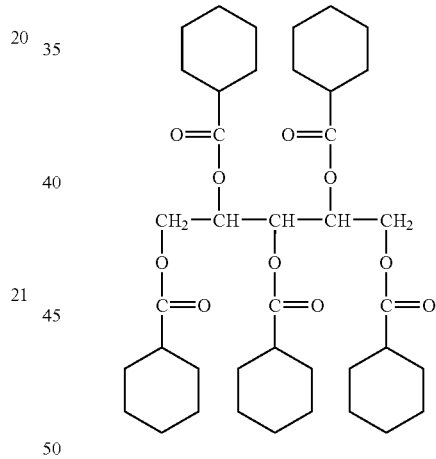
26
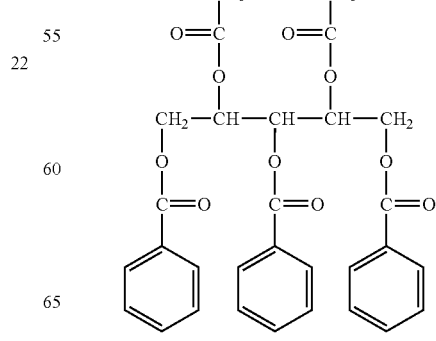

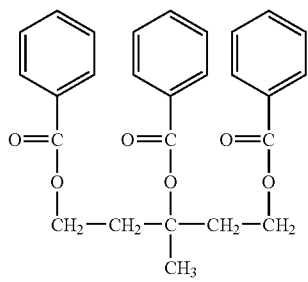

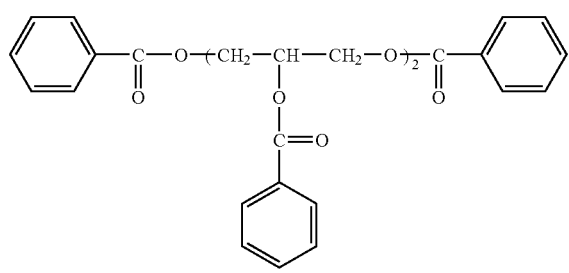

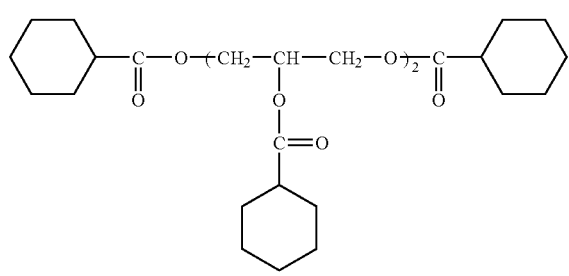

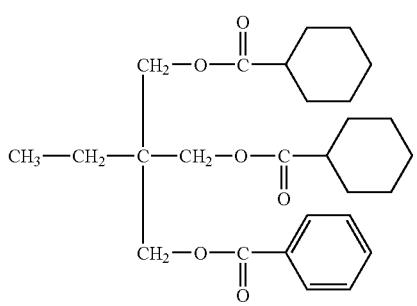

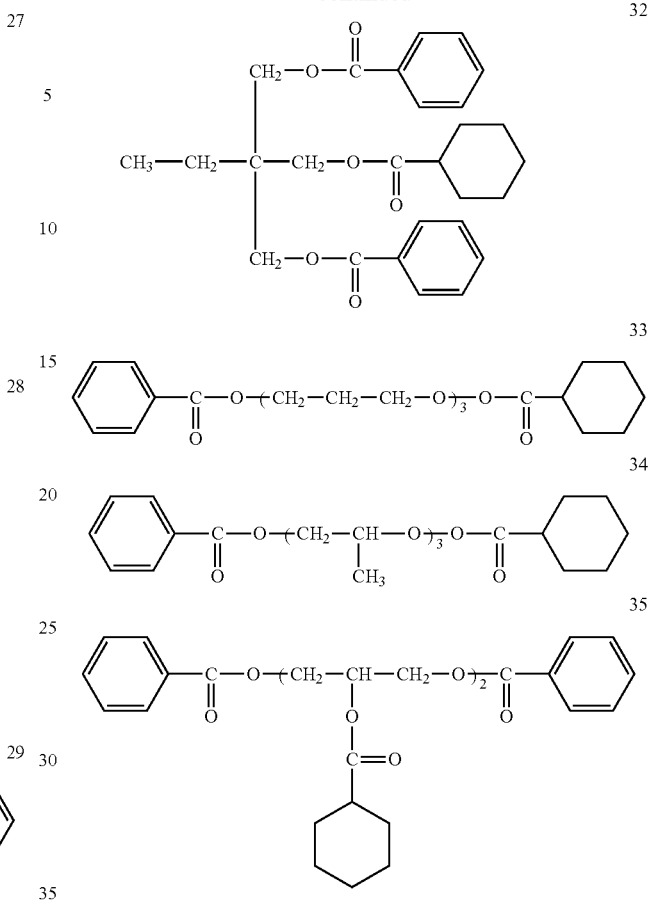

As for the content of the polyalcohol ester according to the present invention, it is desirable to contain 1-15% by mass in a cellulose ester film, and especially it is desirable to contain 3-10% by mass.

The ester plasticizer used in the present invention is not specifically limited, however, an ester plasticizer which has an aromatic ring or a cycloalkyl ring in the molecule are applicable. For example, an ester plasticizer represented by the following Formula (2) are preferably used:

$$B\text{-}(G\text{-}A)_n\text{-}G\text{-}B \qquad \text{Formula (2)}$$

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (2) is structured by benzene monocarboxylic acid group represented with B, an alkylene glycol group or an oxyalkylene glycol group or an aryl glycol group represented with C, and an alkylene dicarboxylic acid group or an aryl dicarboxylic acid group represented with A and is prepared through a reaction similar to the preparation reaction of a common polyester plasticizer.

Examples of a benzene monocarboxylic acid component of the ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the ester plasticizer of the present invention include: ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols. Since alkylene glycol having carbon atoms of 2-12 is especially excellent in compatibility with cellulose ester, it is especially desirable.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the ester plasticizer used in the present invention is preferably 300-1500, and more preferably 400-1000. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

Examples of a synthetic method of an aromatic terminal ester plasticizer are shown below:

<Sample No. 1 (Aromatic Terminal Ester Sample)>

In a container, 410 parts of phthalic acid, 610 parts of benzoic acid, 737 parts of dipropylene glycols and 0.40 parts of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to 100 Pa and, finally, to $4.0\times10^2$ Pa at 200-230° C., while the distillate was removed. The product was filtered to obtain an aromatic terminal ester type plasticizer having the following features:

| | |
|---|---|
| Viscosity (25° C., mPa · s): | 43400 |
| Acid value: | 0.2 |

<Sample No. 2 (Aromatic Terminal Ester Sample)>

An aromatic terminal ester having the following features was prepared in the same manner as Sample No. 1 except that 410 parts of phthalic acid, 610 parts of benzoic acid, 341 parts of ethylene glycol and 0.35 parts of tetra-isopropyl titanates (as a catalyst) were used.

| | |
|---|---|
| Viscosity (25° C., mPa · s): | 31000 |
| Acid value: | 0.1 |

<Sample No. 3 (Aromatic Terminal Ester Sample)>

An aromatic terminal ester having the following features was prepared in the same manner as Sample No. 1 except that 410 parts of phthalic acid, 610 parts of benzoic acid, 418 parts of 1,2-dihydroxypropane and 0.35 parts of tetra-isopropyl titanates (as a catalyst) were used.

| | |
|---|---|
| Viscosity (25° C., mPa · s): | 38000 |
| Acid value: | 0.05 |

<Sample No. 4 (Aromatic Terminal Ester Sample)>

An aromatic terminal ester having the following features was prepared in the same manner as Sample No. 1 except that 410 parts of phthalic acid, 610 parts of benzoic acid, 418 parts of 1,3-dihydroxypropane and 0.35 parts of tetra-isopropyl titanates (as a catalyst) were used.

| | |
|---|---|
| Viscosity (25° C., mPa · s): | 37000 |
| Acid value: | 0.05 |

Although concrete compounds of the aromatic terminal ester type plasticizer according to the present invention are shown below, the present invention is not limited to these.

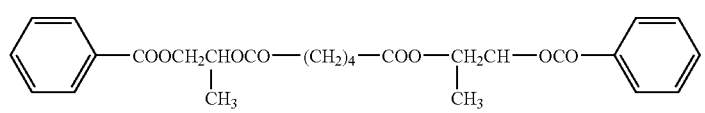

(1)

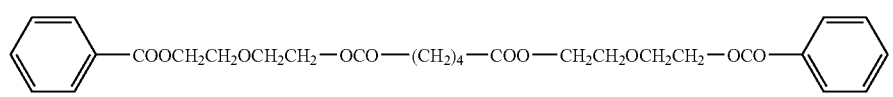

(2)

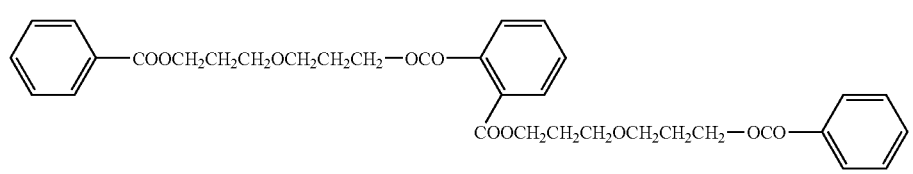

(3)

-continued

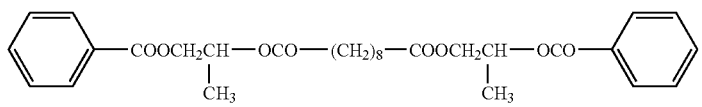
(4)

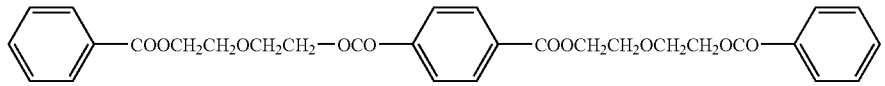
(5)

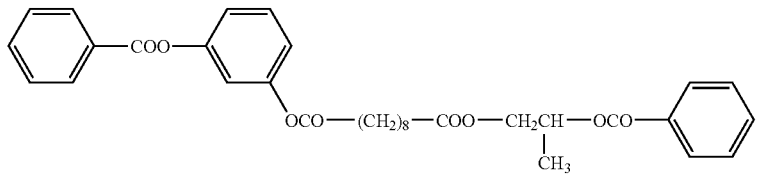
(6)

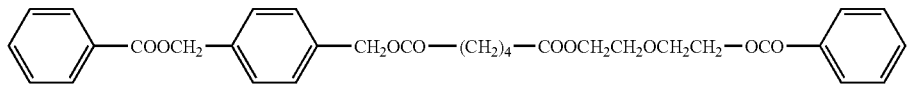
(7)

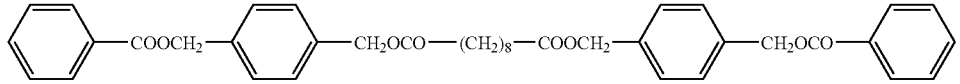
(8)

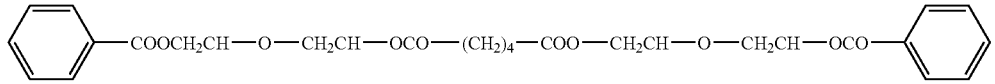
(9)

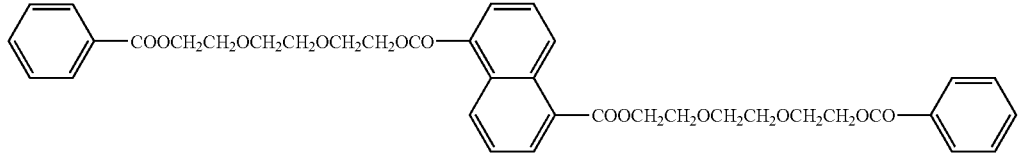
(10)

Polyvalence carboxylic acid type plasticizers useful for the present invention is ester composed of polyvalence carboxylic acid of divalence or more valence, preferably divalence to 20 valence and alcohol. Moreover, aliphatic polyvalence carboxylic acid is desirably 2-20 valence, and aromatic polyvalence carboxylic acid and alicyclic polyvalence carboxylic acid is desirably 3-20 valence.

The polyvalence carboxylic acid used for the present invention is expressed with the following general formula (3).

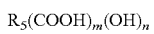 General formula (3)

(Here, $R_5$ represents an organic group of (m+n) valence, m is a positive integer of two or more, and n is an integer of zero or more, COOH group represents a carboxyl group and OH group represents alcoholic or phenol hydroxyl group)

Although the following, for example, can be mentioned as an example of desirable polyvalence carboxylic acid, the present invention is not limited to these.

Aromatic polyvalence carboxylic acid of 3 or more valence or its derivative such as trimellitic acid, trimesic acid, and pyromellitic acid, aliphatic polyvalence carboxylic acid such as succinic acid, adipic acid, azelaic acid, sebacic acid, oxalic acid, fumaric acid, maleic acid and tetra-hydronalium phthalic acid, and oxi- polyvalence carboxylic acid such as tartaric acid, tartronic acid, malic acid, and citric acid etc. can be used preferably. Especially, it is desirable to use oxi-polyvalence carboxylic acid from the aspect of the enhancement for retention properties.

There is no restriction in particular for alcohol used for the polyvalence carboxylic acid ester compound of the present invention, and well-known alcohol and phenol can be used. For example, aliphatic saturated alcohol or aliphatic unsaturated alcohol with normal chain or side chain having carbon atom number of 1 to 32 can be used preferably. The number of carbon atoms is more preferably from 1 to 20 and still more preferably from 1 to 10. Moreover, alicyclic alcohol and its derivative such as cyclopentanol and cyclohexanol, and aromatic alcohol and its derivative such as benzyl alcohol and cinnamyl alcohol can be used preferably.

When using oxi-polyvalence carboxylic acid as polyvalence carboxylic acid, the alcoholic or phenol hydroxyl group of the oxi-polyvalence carboxylic acid may be esterified by using monocarboxylic acid. Although the following can be mentioned as an example of desirable monocarboxylic acid, the present invention is not limited to these.

For aliphatic monocarboxylic acids, normal or branched fatty acids having from 1 to 32 carbon atoms are preferably used. The number of carbon atoms is more preferably from 1 to 20 and still more preferably from 1 to 10.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, lincleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof. Specifically, acetic acid, propionic acid and benzoic acid are preferred.

The molecular weight of the monocarboxylic acid ester is not limited, however, the molecular weight is preferably from 300 to 1000 and more preferably from 350 to 750. A higher molecular weight is preferable in respect of the improvement in retention properties, while a lower molecular weight is preferable with respect to moisture permeability, or to mutual solubility with cellulose ester.

The number of kinds of alcohol used for the polyvalence carboxylic acid ester used for the present invention may be one kind, and a mixture of two or more kinds.

The acid number of a polyvalence carboxylic acid ester compound used for the present invention is desirably 1 mgKOH/g or less, and more desirably 0.2 mgKOH/g or less.

Although the examples of an especially desirable polyvalence carboxylic acid ester compound are shown below, the present invention is not limited to these. For example, triethyl citrate, tributyl citrate, acetyl triethyl citrate (ATEC), acetyl tributyl citrate (ATBC), benzoyl tributyl citrate, acetyl triphenyl citrate, acetyl tri benzyl citrate, dibutyl tartrate, tartaric acid diacetyl dibutyl, trimellitic acid tributyl, pyromellitic acid tetra-butyl, etc. may be listed.

Moreover, acrylic polymer described in Japanese Patent Unexamined Publication No. 2003-12859 may also be added preferably.

These plasticizers may be used independently or in a mixture of two kinds or more. The used amount of a plasticizer of 1% by mass to a cellulose derivative is not preferable, because it provides few effects of reducing the water vapor permeability of a film, and when the used amount exceeds 20% by mass, the plasticizer bleeds out from the film and the property of the film deteriorates. Accordingly, the used amount of 1 to 20% by mass is preferable. The used amount of 6 to 18% by mass is more preferable, and the used amount of 8 to 16% by mass is still more preferable.

A UV absorber preferably can be used for a cellulose resin film of the present invention.

As a UV absorber, a UV absorber which excels in the absorbing power of ultraviolet rays with a wavelength of 370 nm or less and has few absorption of a visible ray with a wavelength of 400 nm or more is preferably used from a viewpoint of excellent liquid crystal display property.

Examples of a UV absorbing agent preferably used in the present invention include; an oxybenzophenone based compound, a benzotriazol based compound, a salicylic acid ester based compound, a benzophenone based compound, a cyanoacrylate based compound, a triazinebased compound and a nickel complex salt.

Examples of benzotriazol based UV absorbing agent will be given below, however, the present invention is not limited thereto.
UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chloro benzotriazole
UV-5: 2-(2'-hydroxy-3'-(3",4",5",6"-tetrahydro phthalimidomethyl)-5'-methylphenyl)benzotriazole
UV-6: 2,2-methylenebis(4-(1,1,3,3-tetramethylbutyl)-6-(2H-benzotriazole-2-yl)phenol)
UV-7: 2-(2'-hydroxy-3'-tert-butyl-5'-methylphenyl)-5-chlorobenzotriazole
UV-8: 2-(2H-benzotriazole-2-yl)-6-(n- and iso-dodecyl)-4-methylphenol (TINUVIN171, product of Ciba Specialty Chemicals Inc.)
UV-9: Mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (TINUVIN109, product of Ciba Specialty Chemicals Inc.)

Specific examples of a benzophenone based compound are shown below, however, the present invention is not limited thereto.
UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

As UV absorbing agent preferably used in the present invention, the benzotriazole or benzophenone type UV absorbing agent is preferably used which has high transparency, and minimizes deterioration of a polarizing plate or a liquid crystal. The benzotriazole type UV absorbing agent is especially preferably used, since it minimizes undesired coloration.

The UV absorbing agent disclosed in JP-A No. 2001-187825 having a distribution coefficient of 9.2 or more provide an improved surface quality of a long roll film and a favorable coating property. Preferable is a UV absorbing agent having a distribution coefficient of 10.1 or more.

A polymer UV absorbing agent (or a UV absorbing polymer) disclosed in Formula (1) or (2) in JP-A No. 6-148430 or Formula (3), (6) or (7) in JP-A No. 2002-47357, or a UV absorbing copolymerization polymer disclosed in paragraph [0027] to [0055] in JP-A No. 2002-169020 are also preferably employable. As a commercially available UV absorbing agent, PUVA-30M (produced by OTSUKA Chemical Co., Ltd.) is cited.

An antioxidant may be used in a cellulose resin film of the present invention. When a liquid crystal image display device etc. is placed in the state of high humidity high temperature, deterioration of a polarizing plate protective film may occur. Since, for example, an antioxidant has a function which delays or prevents a polarizing plate protective film from decompositioning by halogen in residual solvents in the polarizing plate protective film, or by phosphoric acid of a phosphoric acid type plasticizer, etc., it is desirable to make it contain in the above-mentioned polarizing plate protective film.

As such an antioxidant, a hindered-phenol type compound is used preferably. For example, 2,6-di-t-butyl-p-cresol, a penta ERIS retail-tetrakis[3-(3,5-di-t-butyl-4-hydroxyphenyl)propionate], triethylene glycol-bis[3-(3-t-butyl-5-methyl-4-hydroxyphenyl)propionate], 1,6-dihydroxyhexane-bis[3-(3,5-di-t-butyl-4-hydroxyphenyl)propionate], 2,4-bis-(n-octylthio)-6-(4-hydroxy-3,5-di-t-butyl anilino)-1,3,5-triazine, 2,2-chio-diethylenebis[3-(3,5-di-t-butyl-4-hydroxyphenyl)propionate], octadecyl-3-(3,5-di-t-butyl-4-hydroxyphenyl)propionate, N,N'-hexamethylene bis(3,5-di-t-butyl-4-hydroxy-hydrocinnamide), 1,3,5-trimethyl-2,4,6-tris(3,5-di-t-butyl-4-hydroxy benzyl)benzene, tris-(3,5-di-t-butyl-4-hydroxy benzyl)-isocyanurate, etc. may be listed. In particular, 2,6-di-t-butyl-p-cresol, a penta erisretil-tetrakis[3

(3,5-di-t-butyl-4-hydroxyphenyl)propionate], and a triethylene glycol-bis[3-(3-t-butyl-5-methyl-4-hydroxyphenyl)propionate] are desirable. Moreover, for example, phosphorus type processing stabilizers, such as metal deactivator of hydrazine types, such as an N,N'-bis[3-(3,5-di-t-butyl-4-hydroxyphenyl)propionyl]hydrazine, and tris(2,4-di-t-butylphenyl)phosphight may be used together.

As an added amount of these compound, an added amount of 1 ppm to 1.0% at a mass rate to a cellulose derivative is desirable, and 10-1000 ppm are still more desirable.

In the cellulose resin film in the present invention, in order to give sliding property, fine particles can be preferably used.

A primary average particle diameter of fine particles added to a polarizing plate protection film used for the present invention and a retardation film according to the present invention, is desirably 20 nm or less is, more preferably 5-16 nm, and still more preferably 5-12 nm. It is desirable that these fine particles are contained in a retardation film by forming secondary particles with a particle size of 0.1-5 μm, and an average particle diameter of 0.1-2 μm of them is desirable, and the average particle diameter of 0.2-0.6 μm is still more preferably. With this, unevenness (concave/convex) with a height of about 0.1-1.0 μm can be formed on a film surface, and whereby a suitable sliding property can be given to the film surface.

Measurement of the primary average particle diameter of the fine particles used for the present invention is conducted such that 100 particles are observed with a transmission type electron microscope (500,000 to 2,000,000 magnification) so as to measure the diameter of the particles and to determine the mean value of the measured diameters as a primary average particle diameter.

An apparent specific gravity of the fine particles is desirably 70 g/liter, more preferably 90-200 g/liter, and still more preferably 100-200 g/liter. When the apparent specific gravity is larger, it may become more possible to make a high-concentration dispersion liquid and it may become preferable that a haze and a coagulum may be improved. Further, in case that a dope solution having a high solid concentration is prepared as being like the present invention, it is used especially preferably.

Silicon dioxide fine particles having a mean diameter of primary particles of 20 nm or less and an apparent specific gravity of 70 g/liter or more can be obtained such that, for example, a mixture of vaporized silicon tetrachloride and hydrogen is burn in air at 1000-1200° C. Moreover, since it is marketed, for example, with the product name of Aerosil 200V, and Aerosil R972V (manufactured by Japanese Aerosil Co. Ltd,), these can be used for it.

The apparent specific gravity of the above-mentioned description can be calculated with the following formula when silicon dioxide fine particles are taken a fixed quantity in a measuring cylinder and the weight of them is measured at this time:

Apparent specific gravity (g/liter)=the weight (g) of silicon dioxide fine particles/the volume (liter) of silicon dioxide fine particles The following three kinds of methods, for example, may be employed as a method of preparing a dispersion solution of fine particles usable in the present invention.

<<Preparing Method A>>

After carrying out stirring mixing a solvent and fine particles, the mixture is dispersed by a homogenizer. The resultant dispersion solution is made as a fine particle dispersion liquid. The fine particle dispersion liquid is added in a dope solution and is stirred.

<<Preparing Method B>>

After carrying out stirring mixing a solvent and fine particles, the mixture is dispersed by a homogenizer. The resultant dispersion solution is made as a fine particle dispersion liquid. Separately, a small amount of cellulose triacetate is added in a solvent and dissolved by stirring. The resultant solution is added with the fine particle dispersion liquid and is stirred. The resultant liquid is made as a fine particle additive liquid. The fine particle additive liquid is added in a dope solution and is stirred with a line mixer.

<<Preparing Method C>>

A small amount of cellulose triacetate is added in a solvent and dissolved by stirring. The resultant solution is added with fine particle and is dispersed by a homogenizer. The resultant liquid is made as a fine particle additive liquid. The fine particle additive liquid is added in a dope solution and is stirred with a line mixer.

Preparing method A is excellent in dispersion ability for the silicon dioxide fine particles, and Preparing method C is excellent in that the silicon dioxide fine particles hardly recoagulates. Among them, Preparing method B described above is excellent in both the point of the dispersion ability for the silicon dioxide fine particles and the point that the silicon dioxide fine particles hardly recoagulates, therefore, is more preferable.

<<Dispersing Method>>

When mixing silicon dioxide fine particles with a solvent etc., the concentration of the silicon dioxide is desirably 5% by mass to 30% by mass, more desirably 10% by mass to 25% by mass, most desirably 15% by mass to 20% by mass. When the dispersion concentration is higher, liquid turbidity to added amount tends to become low and a haze and a coagulum may be improved, therefore it may be preferable.

As a lower alcohol as the solvent used, methyl alcohol, ethyl alcohol, propyl alcohol, isopropyl alcohol, butyl alcohol, etc. may preferably be listed. Although a solvent other than the lower alcohol is not limited especially, it is desirable to use a solvent which is used at the time of a film production of cellulose ester.

The added amount of silicon dioxide fine particles to a cellulose ester is desirably 0.01 to 5.0 parts by mass of silicon dioxide fine particles to 100 parts by mass of cellulose ester, is more desirably 0.05 to 1.0 parts by mass, and is most desirably 0.1 to 0.5 parts by mass. When the added amount is larger, it may be excellent in a dynamic friction coefficient, and when the added amount is smaller, a coagulum becomes little.

As a homogenizer, a usual homogenizer can be used. The homogenizer is roughly divided into a media homogenizer and a medialess homogenizer. As a homogenization for silicon dioxide fine particles, the medialess homogenizer is desirable, because of low haze. As the media homogenizer, a ball mill, a sandmill, a dieno mill, etc. are may be listed. Although a supersonic wave type, a centrifugal type, a high-pressure type, etc. may be employed as the medialess homogenizer, a high-pressure homogenization apparatus is desirable in the present invention. The high-pressure homogenization apparatus is an apparatus to create a special condition such as a high shearing and a high-pressure state by making a composition mixed of fine particles and a solvent to pass at a high speed through a small tube. When processing with the high-pressure homogenization apparatus, it is desirable that the maximum pressure condition in a small tube having a pipe diameter of 1-2000 μm in the apparatus is 9.807 MPa or more, more preferably 19.613 MPa or more. At this time, an apparatus in which the highest arrival velocity reaches 100 m/sec.

or more, or an apparatus in which a rate of heat transfer reaches more than 420 kJ/hour is desirable.

Example of the high pressure dispersing apparatus includes an ultra high speed homogenizer (commercial name: Microfluidizer) manufactured by Microfluidics Corporation and Nanomizer manufactured by Nanomizer Nanomizer Co., Ltd. Other than the above, Manton-Goulin type high pressure dispersing apparatus such as a homogenizer manufactured by Izumi Food Machinery Co., Ltd is applicable.

Further, casting a dope solution containing fine particles directly onto a casting support is preferable, because a film whose sliding property become high and haze is low can be obtained.

The cellulose resin film of the present invention may contain a retardation controlling agent so as to adjust retardation. For example, the cellulose resin film of the present invention may be provided with a liquid crystal layer so as to form an orientation film, and is processed such the retardation of a polarizing plate protective film and the retardation originated from the liquid crystal layer are made in composite retardation so as to provide an optical compensating function to improve the quality of the liquid crystal display. As for a compound to be added in order to adjust a retardation, it is desirable to use an aromatic compound having two or more aromatic rings as disclosed in the specification of Europe patent 911,656 A2 as a retardation controlling agent. Moreover, two or more kinds of aromatic compounds may be used in combination. The aromatic ring of this aromatic compound includes aromatic heterocycle in addition to an aromatic hydrocarbon ring. It may be preferably aromatic heterocycle, the aromatic heterocycle is usually an unsaturated heterocycle. Especially, 1,3,5-triazine ring is especially desirable.

Moreover, the cellulose resin film of the present invention may desirably contain polymer in order to control optical anisotropy. Although this polymer may not be limited especially, it is desirable to contain a polymer produced by polymerization of for example an ethylenically unsaturated monomer and having the weight average molecular weight of 500 or more and 30000 or less. It is desirable to contain these polymer in an amount of 1 to 35% by weight.

Especially, it is desirable that the above-mentioned polymer is an acrylic polymer having a weight average molecular weight of 500 or more and 30000 or less.

The weight average molecular weight can be measured by the following method.
(Molecular Weight Measuring Method)

The weight average molecular weight is measured by the use of a high liquid chromatography.

The following describes the measurement conditions:
Solvent: methylene chloride
Column: Shodex K806, K805 and K803G (Three pieces manufactured by Showa Denko K.K. were connected for use)
Column temperature: 25 degrees Celsius
Sample concentration: 0.1% by mass
Detector: RI Model 504 (manufactured by GL Science Co., Ltd.)
Pump: L6000 (manufactured by Hitachi Limited)
Flow rate: 1.0 ml/min.
Calibration curve: The calibration curve using 13 samples of the standard polystyrene STK standard polystyrene (manufactured by Toso Co., Ltd) was employed, wherein Mw=1000000 through 500. These 13 samples were placed at an approximately equally spaced interval.

When producing such a polymer, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butylhydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. The method according to the aforementioned Japanese Non-Examined Patent Publication is used in particular preference.

The following lists up the monomers as monomer units constituting the polymer advantageous to the present invention, without the present invention being restricted thereto:

Ethylenic unsaturated monomer units constituting the polymer obtained by polymerization of the ethylenic unsaturated monomer are:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, vinyl benzoate and vinyl cinnamate;

an acrylic acid ester such as methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl)acrylate, benzyl acrylate, phenetyl acrylate, ($\epsilon$-caprolactone) acrylate, (2-hydroxy ethyl)acrylate, (2-hydroxy propyl)acrylate, (3-hydroxy propyl)acrylate, (4-hydroxy butyl)acrylate, (2-hydroxy butyl)acrylate, -p-hydroxy methylphenyl acrylate, and -p-(2-hydroxy ethyl)phenyl acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

The polymer made of the aforementioned monomers can be either copolymer or homopolymer. The preferably used polymer is a vinyl ester homopolymer, a vinyl ester copolymer or a copolymer between vinyl ester and acrylic acid or methacrylic acid ester.

In the present invention, the acryl polymer is defined as an acrylic acid or methacrylic acidalkyl ester homopolymer or copolymer without monomer unit containing an aromatic ring or cyclohexyl group. The acryl polymer having an aromatic ring on the side chain refers to the acryl polymer containing the acrylic acid or methacrylic acid ester monomer unit provided with aromatic ring. The acryl polymer having a cyclohexyl group on the side chain refers to the acryl polymer containing the acrylic acid or methacrylic acid ester monomer unit equipped with cyclohexyl group.

The acrylic acid ester monomer without aromatic ring or cyclohexyl group is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl)acrylate, ($\epsilon$-caprolactone) acrylate, (2-hydroxy ethyl)acrylate, (2-hydroxy propyl) acrylate, (3-hydroxy propyl)acrylate, (4-hydroxy butyl)acrylate, (2-hydroxy butyl)acrylate, (2-methoxy ethyl)acrylate, and (2-ethoxy ethyl)acrylate, or these substances with the acrylate thereof replaced by methacrylate.

The acryl polymer is a homopolymer or copolymer of the aforementioned monomer. It preferably contains 30% by mass or more of the acrylic acid methyl ester monomer unit, and 40% by mass or more of the methacrylic acid methyl ester monomer unit. The homopolymer of methyl acrylate or methyl methacrylate is particularly preferred.

The acrylic acid or methacrylic acid ester monomer containing the aromatic ring is exemplified by phenyl acrylate, phenyl methacrylate, (2- or 4-chlorophenyl)acrylate, (2- or 4-chlorophenyl)methacrylate, (2-, 3- or 4-ethoxycarbonylphenyl)acrylate, (2-, 3- or 4-ethoxycarbdonylphenyl)methacrylate, (o-, m- or p-tolyl)acrylate, (o-, m- or p-tolyl)methacrylate, benzyl acrylate, benzyl methacrylate, phenethyl acrylate, phenethyl methacrylate, and (2-naphthyl)acrylate. Benzyl acrylate, benzyl methacrylate, phenethyl acrylate, and phenethyl methacrylate can preferably be used.

The acryl polymer having aromatic ring on the side chain preferably contains 20 through 40% by mass of the acrylic acid or methacrylic acid ester monomer unit having the aromatic ring, and 50 through 80% by mass of acrylic acid or methacrylic acid methyl ester monomer unit. The aforementioned polymer preferably contains 2 through 20% by mass of acrylic acid or methacrylic acid ester monomer unit containing the hydroxyl group.

The acrylic acid ester monomer containing the cyclohexyl group is exemplified by cyclohexyl acrylate, cyclohexyl methacrylate, (4-methyl cyclohexyl)acrylate, (4-methyl cyclohexyl)methacrylate, (4-ethyl cyclohexyl)acrylate, and (4-ethyl cyclohexyl)methacrylate. The acrylic acid cyclohexyl and methacrylic acid cyclohexyl can preferably be employed.

The acryl polymer having a cyclohexyl group on the side chain preferably includes 20 through 40%, and 50 through 80% by mass of acrylic acid or methacrylic acid ester monomer unit containing a cyclohexyl group. The aforementioned polymer preferably includes 2 through 20% by mass of the acrylic acid or methacrylic acid ester monomer unit containing the hydroxyl group.

The polymer and acryl polymer obtained by polymerization of the aforementioned ethylenic unsaturated monomer; acryl polymer having the aromatic ring on the side chain; and acryl polymer having the cyclohexyl group on the side chain all provide excellent compatibility with the cellulose resin.

The acrylic acid or methacrylic acid ester monomer having the aforementioned hydroxyl group is based on the structural unit of a copolymer, not homopolymer. In this case, acrylic acid or methacrylic acid ester monomer unit including the hydroxyl group preferably accounts for 2 through 20% by mass in the acryl polymer.

In the present invention, the polymer including a hydroxyl group on the side chain can be preferably utilized. Similarly to the case of the aforementioned monomer, acrylic acid or methacrylic acid ester is preferably used as the monomer unit having a hydroxyl group, and is exemplified by (2-hydroxy ethyl)acrylate, (2-hydroxy propyl)acrylate, (3-hydroxy propyl)acrylate, (4-hydroxy butyl)acrylate, (2-hydroxy butyl) acrylate, p-hydroxy methylphenyl acrylate, p-(2-hydroxy ethyl)phenyl acrylate, or the same wherein the aforementioned acrylic acid is replaced by the methacrylic acid. Use of the acrylic acid-2-hydroxy ethyl acrylate, and 2-hydroxy ethyl methacrylate is preferred. Preferably 2 through 20% by mass, more preferably 2 through 10% by mass of the acrylic acid ester or methacrylic acid ester monomer unit having a hydroxyl group in the polymer is included in the polymer.

It goes without saying that the aforementioned polymer including 2 through 20% by mass of monomer unit containing the aforementioned hydroxyl group provides excellent miscibility with the cellulose ester, outstanding retentivity and dimensional stability, minimized moisture permeability, and prominent dimensional stability, superb adhesiveness with polarizer as a polarizing plate protective film and improved durability of the polarizing plate.

There is no restriction to the method for allowing at least one of the terminals of the principal chain of the acryl polymer to have a hydroxyl group, it such a method ensures a hydroxyl group to be provided on the terminal of the principle chain in particular. Such a method is exemplified by: the method of using such a radical polymerization initiator including a hydroxyl group as azobis (2-hydroxy ethylbutylate); the method of using such a chain transfer agent having a hydroxyl group as 2-mercaptoethanol; the method of using a polymerization terminator having a hydroxyl group; the method of ensuring the hydroxyl group to be provided on the terminal by living ion polymerization; and the method of bulk polymerization based on polymerization catalyst through the use of a compound containing one thiol group and secondary hydroxyl group or through the combined use of this compound and organic metal compound, as disclosed in the Japanese Non-Examined Patent Publication 2000-128911 or 2000-344823. Use of the method disclosed in the Japanese Non-Examined Patent Publication is preferred in particular. The polymer manufactured by the method disclosed therein is available on the market under the trade name of Actflow Series manufactured by Soken Kagaku Co., Ltd. This is preferably used. The polymer having a hydroxyl group on the aforementioned terminal and/or the polymer having a hydroxyl group on the side chain provides a substantial improvement of the compatibility and transparency of the polymer.

As the ethylenic unsaturated monomer, a polymer using a styrene may be employed. Such styrene is exemplified by styrene, methyl styrene, dimethyl styrene, trimethyl styrene, ethyl styrene, isopropyl styrene, chloromethyl styrene, methoxy styrene, acetoxystyrene, chlorostyrene, dichloro styrene, bromostyrene, and vinyl methyl benzoate ester, without being restricted thereto. Polymerization can be made with the monomers mentioned as the aforementioned unsaturated ethylenic monomers, or two or more aforementioned polymers can be used to achieve compatibility with the cellulose resin for the purpose of controlling the double refraction.

The content of the polymer in the cellulose resin film is desirably 1 to 35% by weight. When it is 1% by weight or more, it is desirable, because the control of a retardation value can fully be performed. Moreover, when it is 35% by weight or less, it is desirable, because it is excellent in an adhesive property with Polarizer PVA.

A cellulose ester film used in the present invention is desirable to be used for a component for a liquid crystal display from points of high water-vapor permeability, dimensional stability, etc. The component for a liquid crystal display is a component used for a liquid crystal display device, and for example, it is preferably used as a protective film for a polarizing plate. Furthermore, it is possible to provide it with functional layers such as an anti reflection layer, a hard coat layer, an anti-glare layer, an anti pollution layer, an optical anisotropic layer, an orientation layer, a liquid crystal layer, a back coat layer, an antistatic layer and a light diffusion layer in proper combination. Especially when it is used for the uppermost surface of a liquid crystal display as a polarizing plate protective film A1, it is desirable to prepare an antireflection layer on a film surface.

(Anti-reflection Layer)

The anti-reflection layer owing to optical interference which is employed in the present invention will be described.
(Configuration of Anti-reflection Layer)

The anti-reflection layer may be a single-layer structured low refractive index layer or a multi-layer structured refractive index layer. The hard coat layer is provided on a transparent film support, and the anti-reflection layer can be laminated on the support surface so as to reduce reflectance because of optical interference in consideration of refractive index, thickness, the number of layers, and the order of layers. The anti-reflection layer possesses high refractive index layers having a higher refractive index than that of the support and a low refractive index layer having a lower refractive index than that of the support in combination, but an anti reflection layer having at least 3 refractive index layers is particularly preferable. It is preferred that a medium refractive index layer (higher refractive index than that of a support or a hard coat layer and lower refractive index than that of a higher refractive index layer), a high refractive index layer and a low refractive index layer are laminated in this order for the three layers of different refractive indices from the support side. A hard coat layer may serve for a high refractive index layer.

Preferable examples of the layer structure in an antireflection film of the present invention are described below. Symbol "/" indicated below means "laminated" here.

Back coat layer/support/hard coat layer/low refractive index layer

Back coat layer/support/hard coat layer/high refractive index layer/low refractive index layer Back coat layer/support/hard coat layer/medium refractive index layer/high refractive index layer/low refractive index layer Back coat layer/support/antistatic layer/hard coat layer/medium refractive index layer/high refractive index layer/low refractive index layer Antistatic layer/support/hard coat layer/medium refractive index layer/high refractive index layer/low refractive index layer Back coat layer/support/hard coat layer/high refractive index layer/low refractive index layer/high refractive index layer/low refractive index layer In order to easily remove stains or fingerprints, an anti-stain layer is preferably provided on the outermost low refractive index layer. A fluorine-containing organic compound is preferably used in the anti-stain layer.
(Actinic Ray Cured Resin Layer)

In the present invention, it is desirable that an actinic ray cured resin layer is coated on the cellulose resin film. A producing method for an actinic ray cured resin layer used as a hard coat layer is explained hereafter.

An actinic ray cured resin layer is preferably used as a hard coat layer used for a cellulose ester film of the present invention.

The actinic ray curable resin layer refers to a layer which contains, as a main component, a resin cured through a crosslinking reaction when exposed to actinic rays such as UV light or electron beams. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Listed as UV curable resins may be, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UV ray curable polyesteracrylate resins include those prepared easily by reacting a polyesterpolyol with 2-hydroxyethylacrylate or 2 hydroxypropylacrylate, disclosed for example, in Japanese Patent O.P.I. Publication No. 59-151112.

Examples of the UV ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives, an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-10P20, AG-106 and M-101-C (manufactured by Koei Kagaku Co., Ltd.); Seikabeam PHC2210(S), PHC X-9(K-3), PHC2213, DP-10, DP-20, DP-30, P1000, P1100, P1200, P1300, P1400, P1500, P1600, SCR900 (manufactured by Dainichiseika Kogyo Co., Ltd.); KRM7033, KRM7039, KRM7130, KRM7131, UVECRYL29201 and UVECRYL29202 (manufactured by Daicel U. C. B. Co., Ltd.); RC-5015, RC-5016, RC 5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. An air cooling or a water cooling light source is preferably used. The preferable irradiation quantity of light may be changed depending on the type of lamp, however, it is preferably from 5 to 150 mJ/cm$^2$, and more preferably from 20 to 100 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used a method of providing tension while the film is being transported over back rolls, and a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3749, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF945, KF6004, silicone X-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoseisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-344, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 20 μm. Most preferably it is from 8 to 20 μm.

Moreover, it is desirable that a hard coat layer has a pencil hardness of 2H-8H. Especially, it is more desirable that the pencil hardness is 3H-6H. The pencil hardness can be measured as follows: after the produced hard court film sample is subjected to a humidity control for 2 hours on the conditions of the temperature of 25° C. and a relative humidity of 60%, scratching is repeated 10 times onto the sample with the pencil of each hardness under the application of the weight of 1 kg in accordance with the pencil hardness valuation method specified in JIS-K-5400 by the use of test pencils specified in JIS-S-6006. In the test result, the pencil hardness represents the number of scratching in which no injury is observed.

The UV ray-curable resin layer is preferably irradiated with UV rays during or after drying. The duration of UV ray irradiation is preferably from 0.1 seconds to 5 minutes in order to secure the exposure amount from 5 to 150 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/cm$^2$ on the irradiated surface.

The UV-cured resin layer thus obtained may preferably contain inorganic or organic microparticles in order to attain the following characteristics, preventing blocking, improving scratch resistance, providing an antiglare property and optimizing the reflective index.

Examples of inorganic microparticles used for the hard coat layer, include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of poly-methacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of the microparticles is preferably from 0.005 to 5 μm and specifically preferably from 0.01 to 1 μm. Moreover, it is desirable that the value of Ra/Sm calculated from the average length Sm of the contour curvilinear element specified in JIS B 0601 is 0.008 or less.

The center-line average roughness (Ra) is preferably measured by means of a surface roughness meter using interference of light, for example, RST/PLUS manufactured by WYKO Co., Ltd.

Moreover, it may also preferable to us an ultraviolet curable-resin layer provided with antiglare property grant which is provided by the formation of convexo-concave on the surface of the ultraviolet curable-resin layer by the use of an embossing roll on which convexo-concave are prepared beforehand, or by the inkjet method or the printing method.
(Back Coat Layer)

The hard coat film of the present invention having a hard coat layer on one surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Inorganic microparticle available on the market include, for example: AEROSIL R972, P927V, R974, R812, 200, 200V, 300, R202, OX50 and TT600 which are manufacture by Nippon Aerosil Co. Ltd. Microparticles of zirconium oxide available on the market include, for example: AEROSIL R976 and R811 manufacture by Nippon Aerosil Co. Ltd. Microparticles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 120, 145, 3120 and 240, which are manufactured by Toshiba Silicone Co., Ltd.

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably less than 0.9 and specifically preferably from 0.1 to 0.9.

The content of microparticles contained in the back coat layer is preferably from 0.1 to 50 percent by weight and more preferably from 0.1 to 10 percent by weight. The increase in haze after the hard coat film is provided with a back coat layer is preferably less than 1 percent, more preferably less than 0.5 percent and specifically preferably from 0.0 to 0.1 percent.

The back coat layer is formed by means of a coating method using a coating solution containing a solvent which dissolves and/or swells cellulose ester. The solvent may occasionally be comprised of a solvent which does not dissolve nor swell cellulose ester. The mixing ratio of these solvents and the amount of the coating solution to be used for forming a back coat layer is appropriately determined depending on the extent of the curl and the type of the resin used for the hard coat film.

In order to enhance a curl preventing function, it is effective to increase the mixing ratio of a solvent capable of solving used solvent composition and/or a solvent capable of swelling and to decrease the ratio of solvent incapable of solving. The mixing ratio of (solvent capable of solving and/or solvent capable of swelling) (solvent incapable of solving) is preferably 10:0 through 1:9. Examples of solvent capable of solving and/or swelling transparent film included in these mixed compositions, include: dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of solvent incapable of solving, include: methanol, ethanol, n-propyl alcohol, i-propyl alcohol, n-butanol and hydrocarbons (such as toluene, xylene and cyclohexane).

The back coat layer is coated by means of, for example: a gravure coater, a dip coater, a reverse coater, a wire-bar coater and a die coater, in a thickness of preferably from 1 to 100 μm and specifically preferably from 5 to 30 μm. Resins utilized as a binder in a back coat layer include, for example: vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; cellulose ester type resins such as cellulose nitrate, cellulose acetate propionate, cellulose diacetate, cellulose triacetate, cellulose acetate phthalate and cellulose acetate butylate; rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; a silicone type resin; and a fluorine-containing type resin, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, ER-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubisi Rayon Co., Ltd.). A resin used in the present invention may suitably be selected from the above examples.

Cellulose type resin such as diacetyl cellulose and cellulose acetate propionate is specifically preferable.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of a back coat layer may preferably be divided in two or more times.

(Low Refractive Index Layer)

In the case where an antireflection layer is provided on the cellulose resin film produced by the method of the present invention, the following hollow silica particles are preferably used in the low refractive index layer.

<Hollow Silica Particles>

The hollow particles can be classified into (1) the composite particles made or porous particle and the coated layer arranged on this porous particle surface; and (2) the hollow particles that have a hollow interior filled with solvent, gas or porous substances. The low-refractive index layer coating solution may contain (1) composite particles and/or (2) hollow particles.

Herein, hollow particles are particles the interior of which is provided with a hollow, and the hollow is surrounded by a particle wall. The interior of the hollow is filled with the contents such as a solvent, a gas or a porous substance which have been utilized in preparation. The mean particle size of such hollow particles is preferably in a range of 5-300 nm and preferably of 10-200 nm. The mean particle size of hollow particles utilized is appropriately selected depending on the thickness of the formed transparent cover film and is preferably in a range of ⅔-1/10 of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such a porous particle, mole ratio $MO/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased. Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those comprising single component or mixture of plural components.

As a manufacturing method of such hollow particles, a preparation method of complex oxide colloidal particles, disclosed in paragraph Nos. [0010]-[0033] of JP-A No. 7-133105 (JP-A refers to Japanese Patent Publication Open to Public Inspection), is suitably applied.

Since the inside of hollow particles is hollow, the refractive index of the thus obtained hollow particles is low. Therefore, the refractive index of a low refractive index layer employing those hollow particles and used for the present invention is desirably 1.30 to 1.50, and still more desirably 1.35 to 1.44.

The content (weight) of the hollow silica fine particles whose insides are porous or hollow, in a low refractive index layer coating liquid is preferably 10 to 80% by weight, more preferably 20 to 60% by weight.

(Tetraalcoxy Silane Compound or Hydrolysate Thereof)

A tetraalcoxy silane compound or its hydrolysate as a sol-gel material is preferably contained in a low refractive index layer of the present invention.

As components for the low refractive index layer usable in the present invention, organic group-containing silicon oxides other than the foregoing inorganic silicon oxides are preferably usable. These are generally called sol-gel components. Preferably employed as such sol-gel components may be metal alcoates, and organoalkoxy metal compounds and hydrolysis products thereof. Particularly preferred are alkoxysilane, and hydrolysis products thereof. It is also preferable to use tetraalkoxysilane (tetramethoxysilane and tetraethoxysilane), alkyltrialkoxysilane (methyltrimethoxysilane, and ethyltrimethoxysilane), aryltrialkoxysilane (phenyltrimethoxysilane), dialkyldialkoxysilane, diaryldialkoxysilane, and the like.

It is preferred that the low refractive index layer employed in the present invention contains the foregoing silicon oxide and the following silane coupling agent.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, and phenyltriacetoxysilane.

Further, examples of silane coupling agents having two alkyl substituents for silicon include dimethyldimethoxysilane, phenylmethyldimethoxysilane, dimethyldiethoxysilane, and phenylmethyldiethoxysilane.

Specific examples of silane coupling agents produced by Shin-Etsu Chemical Co, Ltd include KBM-303, KBM-403, KBM-402, KBM-403, KBM-1403, KBM-502, KBM-503, KBE-502, KBE-503, KBM-603, KBE-603, KBM-903, KBE-903, KBE-9103, KBM-802 or KBM-803.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating solution in advance.

It is also preferable that the low refractive index layer incorporates polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles.

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenic unsaturated monomers. In order to prepare crosslinked binder polymers, it is preferable to employ monomers having at least two ethylenic unsaturated groups. Listed as examples of monomers having at least two ethylenic unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides.

The low refractive index layers usable in the present invention may be a low refractive index layer formed by crosslinking of fluorine containing resins (hereinafter referred to as "fluorine containing resins prior to crosslinking") which undergo crosslinking via heating or ionizing radiation.

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). Japanese Patent O.P.I. Publication Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

The ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

The low refractive index layer of the present invention can be formed via coating, employing a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528 and "Yuji Harasaki: Coating Engineering, p. 253 (1973), published by Asakura Publishing Co., Ltd."

The low refractive index layer of the present invention preferably has a thickness of 50-200 nm, and more preferably has a thickness of 60-150 nm.

(High Refractive Index Layer and Medium Refractive Index Layer)

In the present invention, a high refractive index layer is preferably arranged between a transparent support and a low refractive index layer. Further, to arrange a medium refractive index layer between a transparent substrate and a high refractive index layer is preferred to reduce the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of a high refractive index layer and a medium refractive index layer is preferably 5 nm 1 µm, more preferably 10 nm-0.2 µm and most preferably 30 nm-0.1 µm. The haze of a high refractive index layer and a medium refractive index layer is preferably not more than 5%, more preferably not more than 3% and most preferably not more than 1. The strength of a high refractive index layer and a medium refractive index layer is preferably not less than H based on pencil hardness at a loading weight of 1%, more preferably not less than 2H and most preferably not less than 3H.

It is preferable that the medium and high refractive index layers in the present invention are formed in such a manner that a coating solution containing a monomer or oligomer of an organic titanium compound represented by following Formula (1), or hydrolyzed products thereof are coated and subsequently dried, and the resulting refractive index is 1.55-2.5.

$$Ti(OR_1)_4 \quad \text{Formula (1)}$$

where $R_1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinking structure via reaction such as —Ti—O—Ti, whereby a cured layer is formed.

Listed as preferred examples of monomers and oligomers of organic titanium compounds employed in the present invention are dimers-decamers of $Ti(OCH_3)_4$, $Ti(OC_2H_5)_4$, $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$, dimers-decamers of $Ti(O\text{-}i\text{-}C_3H_7)_4$, and dimers-decamers of $Ti(O\text{-}n\text{-}C_4H_9)_4$. These may be employed singly or in combination of at least two types. Of these, particularly preferred are dimers decamers of $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$ and dimers-decamers of $Ti(O\text{-}n\text{-}C_4H_5)_4$.

The content of monomers and oligomers of organic titanium compounds employed in the present invention, as well as hydrolyzed products thereof is preferably 50.0-93.0% by weight with respect to solids incorporated in the liquid coating composition. The solid ratio is more preferably 50-90% by weight, but is still more preferably 55-90% by weight. Other than these, it is preferable to incorporate polymers of organic titanium compounds (which are subjected to hydrolysis followed by crosslinking) in a liquid coating composition, or to incorporate titanium oxide particles.

The high refractive index and medium refractive index layers in the present invention may incorporate metal oxide particles as particles and further may incorporate binder polymers.

In the above method of preparing a coating solution, when hydrolyzed/polymerized organic titanium compounds and metal oxide particles are combined, both strongly adhere to each other, whereby it is possible to obtain a strong coating layer provided with hardness and flexibility in evenly coated layer.

The refractive index of metal oxide particles employed in the high and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter of at most 20-30 nm are determined employing electron microscope images. The specific surface area of metal oxide particles is preferably 10-400 m$^2$/g as a value determined employing the BET method, is more preferably 20-200 m$^2$/g, but is most preferably 30-150 m$^2$/g.

Examples of metal oxide particles are metal oxides containing at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

A ratio of metal oxide particles in the high and medium refractive index layers is preferably 5-65% by volume, more preferably 10-60% by volume, and still more preferably 20-55% by volume.

The above-described metal oxide particles are supplied to a coating solution, which forms a high refractive index layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In a high refractive index layer and a medium refractive index layer usable in the present invention, polymer having a cross-linked structure (hereinafter, also referred to as cross-linked polymer) is preferably utilized as binder polymer. Examples of cross-linked polymer include cross-linked compounds of polymer provided with a saturated hydrocarbon chain such as polyolefin (hereinafter, generally referred to as polyolefin), polyether, polyurea, polyurethane, polyester, polyamine, polyamide and melamine resin. Among them preferable are cross-linked compounds of polyolefin, polyether and polyurethane, more preferable are cross-linked compounds of polyolefin and polyether, and most preferably are cross-linked compounds of polyolefin.

In the present invention, examples of monomer having at least two ethylenic unsaturated group include ester of polyhydric alcohol and (meth)acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa(meth) acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer having an anionic group which is available on the market and preferably utilized includes Kayamar PM-21 and PM-2 (manufactured by Nippon Kayaku Co., Ltd.); Antox MS-60, MS-2N and MS-NH4 (manufactured by Nippon Nyukazai Co., Ltd.); Anilox M-5000, M-6000 and M-8000 series (manufactured by Toagosei Co., Ltd.); Viscoat #2000 series (manufactured by Osaka Organic Chemical Industry Ltd.); Newfrontier GX-8289 (manufactured by Dai-Ichi Kogyo Seiyaku Co., Ltd.); NK Ester CB-1 and A-SA (manufactured by Shin-Nakamura Chemical Co., Ltd.); and AR-100, MR-100 and MR-200 (manufactured by Dai-Hachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and NewFrontier C-1615 (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator utilized to form binder polymer of a hard coat layer.

As a polymerization initiator, those available on the market may be utilized. A polymerization accelerator may be utilized in addition to a polymerization initiator. The addition amount of a polymerization initiator and a polymerization accelerator is preferably in the range of 0.2-10 mass % based on the total amount of monomer.

Added to each of the anti-reflection layers or the liquid coating compositions thereof may be polymerization inhibitors, leveling agents, thickeners, anti-coloring agents, UV absorbents, silane coupling agents, antistatic agents, and adhesion providing agents, other than the foregoing components such as metal oxide particles, polymers, dispersion media, polymerization initiators and polymerization accelerators.

In order to accelerate hydrolysis or curing of a composition containing metallic alkoxide, application of actinic radiation is preferable, after coating a medium or high refractive index layer in the present invention, or a low refractive index layer. Exposure to actinic radiation each time a layer is coated is more preferable.

There is no restriction to the type of the energy source for applying the actinic energy radiation used in the present invention, if it activates the compound by the ultraviolet ray, electron beam or gamma ray. The ultraviolet ray and electron beam are preferably used. The ultraviolet ray is particularly preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use the low voltage mercury lamp, intermediate voltage mercury lamp, high voltage mercury lamp, extra-high voltage mercury lamp, carbon arc light, metal halide lamp and xenon lamp. Further, the ArF excimer laser, KrF excimer laser, excimer lamp and synchrotron radiation can also be used. The conditions on irradiation differs according to each type. The preferred amount of irradiation is 20-10,000 mJ/cm$^2$. The more preferred amount is 100-2000 mJ/cm$^2$, and still more preferred amount is 400-2000 mJ/cm$^2$.

(Polarizing Plate)

A polarizing plate can be prepared by a general method. The back side of a cellulose ester film of the present invention has been subjected to an alkali saponification treatment, is preferably pasted up on at least one surface of polarizer film prepared by being dipped and stretched in an iodine solution, by use of a completely saponified type polyvinyl alcohol aqueous solution. On the other surface, said film may be utilized or another polarizing plate protective film including cycloolefin resin, polycarbonate resin, polylactic acid resin, polyester resin, and cellulose ester resin may be utilized. The polarizing plate protective film preferably includes a hard coat layer having a thickness of 8 to 20 μm and an antiglare layer. For example, preferably utilized is polarizing plate protective film provided with a hard-coat layer or an antiglare layer described in such as JP-A Nos. 2003-114333, 2004-203009, 2004-354699 and 2004-354828. Further, said hard-coat layer or antiglare layer is preferably accumulated with such as an antireflection layer and an anti-stain layer.

In addition to these, also preferably utilized is polarizing plate protective film which combines optical compensation film having an optical anisotropic layer formed by orientating a liquid crystal compound such as discotic liquid crystal, bar-form liquid crystal and cholesteric liquid crystal. For example, an optical anisotropic layer can be formed by a method described in JP-A 2003-98348. Combination use with a polarizing plate of the present invention can provide a liquid crystal display having excellent flatness and a stable viewing angle enlargement effect.

Polalizer film as a primary constituent element of a polarizing plate is an element which passes light having a polarized wave plane in a predetermined direction, and typical polarizer film commonly known at present is polyvinyl alcohol type polarizer film, which is classified into polyvinyl alcohol type film being dyed with iodine and one being dyed with dichroic dye. Polarizer film is prepared by film formation from polyvinyl alcohol aqueous solution, and the obtained film is uniaxially stretched and dyed, or is uniaxially stretched after dying, preferably followed by being subjected to a durability treatment with a boron compound. One surface of optical film of the present invention is pasted up on the surface of said polarizer film to prepare a polarizing plate. Pasting up is preferably carried out by use of a water-based adhesive comprising completely saponified polyvinyl alcohol as a primary component.

Further, ethylene modified polyvinyl alcohol is also utilized as polarizer film. The thickness of polarizer film is preferably 5-30 µm and specifically preferably 10-25 µm.

(Display Unit)

By the incorporation of the polarizing plate of the present invention into a display unit, it is possible to produce the display unit of the present invention excellent in various visibilities. The cellulose resin film of the present invention and the antireflection film employing the film are preferably used in a reflection type, transmission type, or half-transmission type LCD or a LCD of various drive types, such as a TN type, a STN type, an OCB type, a HAN type, a VA type (a PVA type, a MVA type), and an IPS type. Especially, in a display unit having a screen of 60 type or more, in particular, a big screen of 70 to 90, there is no white omission in screen periphery portions and the effect is maintained for a long period of time, and a prominent effect is recognized in a MVA type liquid crystal display. In particular, there were effects that an irregular color, less glare, little waving unevenness, and eyes not having get tired under long observation.

EXAMPLE

Hereafter, although the present invention will be explained in detail based on examples, the embodiment of the present invention is not limited to these examples.

In those examples, the amount of remaining solvent, Ro, and Rt were measured by the following methods.

(Amount of Remaining Solvent)

Amount of remaining solvent (percent by weight)= $\{(M-N)/N\} \times 100$

Here, M represents the weight of a web at an arbitrarily selected time point and N represents the weight of the web when the web (M) is dried for 3 hours at 110° C.

(Ro, Rt)

Three Dimensional Refractive Index Measurement was conducted for a test sample under a test environment of 23° C. and 55 RH at a wavelength of 590 nm by the use of an automatic double refractometer KOBRA-21ADH (manufactured by Oji Scientific Instruments) such that an angle between a slow axis and a transverse direction, a refractive index nx of a slow axis direction, a refractive index ny of a fast axis direction, and a refractive index nz of a thickness-wise direction. Then, a retardation (Ro) of an in-plane direction and a retardation (Rt) of a thickness-wise direction were calculated by the following formulas Here, in the formulas, "d" represents a thickness (nm) of a film.

$$Ro=(nx-ny)\times d$$

$$Rt=((nx+ny)/2-nz)\times d$$

<<Production of a Cellulose Resin Film>>

Example 1

Into a pressurized closed container, 100 parts by weight of cellulose acetate propionate having an acetyl group substitution degree of 1.95, a propionyl group substitution degree of 0.7, and a number average molecular weight of 75000, 10 parts by weight of trimethylolpropanetribenzonate, 2 parts by weight of ethylphthalyl ethyl glycolate, 300 parts by weight of methyl acetate (boiling point: 56.9° C.) and 900 parts by weight of ethanol were supplied, heated to 80° C., and stirred under the condition that the pressure in the container was made 200 kPa. Then, cellulose ester were dissolved completely while being stirred, whereby a dope solution was obtained. After the dope solution was filtered by the use of Azumi filter paper No. 244 manufactured by Azumi Filter Paper Corporation, the dope solution was cooled to 50° C. and was kept on still standing overnight, thereafter, the dope solution was subjected to a defoaming operation.

The above-mentioned dope was cast to form a film onto a stainless steel belt from a casting die. The film was dried for one minutes on the stainless steel belt which was heated to 55° C. with a temperature control to bring warm water in contact with the back surface of the stainless steel belt, thereafter, the film was kept for 10 seconds under the condition that the back surface of the stainless steel belt was made in contact with cold water of 15° C., and then the half-dry film was separated or separated from the stainless steel belt. At the time of being separated, an amount of remaining solvent in the film was 70% by weight.

Subsequently, after the separated film was dried while being conveyed for one minutes at 70° C., the both edges of the film were grasped by clips and introduced into the first widthwise grasping process by a tenter device shown in FIG. 3 and subjected to a transversely stretching. At this time, the temperature conditions in the tenter were set to 90° C. in a preheating zone, 130° C. in a stretching zone, 120° C. in a holding/easing zone, and 30° C. in a cooling zone. A draw ratio (stretching magnification) was made to 1.01 times. An easing operation was conducted from the holding/easing zone to the cooling zone with an easing ratio of 2%. Moreover, hot gas wind was blown on a grasping tool in a return side rail section so that the temperature of the grasping tool in a grasping starting point became 70° C. The amount of remaining solvent in the film was about 40% by weight at the grasping starting point, about 30% by weight at the outlet of the stretching zone, and about 10% by weight at the outlet of the cooling zone.

Successively, after being released from the widthwise grasping, the film was dried for 20 minutes at 130° C. while being conveyed by rollers. Then, as shown in FIG. 4(a), an ear-cut was conducted for the both edges of the film by a slitting process, thereafter, 2 cm width heat treatment applied portions having an emboss section of 20 µm thickness were provided at positions of 50 mm distant from both edges of the film by an embossing roller heated to 200° C., whereby an original film of 105 µm thickness and 1.5 m width were produced. Subsequently, in the second widthwise grasping process by a tenter device shown in FIG. 3, the both edges of the film were widthwise grasped and subjected to a widthwise stretching under 150° C. with a draw ratio of 1.3 times, and an ear-cut was conducted to the stretched film in a slitting process, whereby a cellulose resin film of 80 μm film thickness and 1.95 m width were obtained.

The obtained film had Ro of 40 nm and Rt of 130 nm, and there was no defect on the surface of the film, therefore, the film was a proper one to be used as a film for optics. Moreover, the introducing to the tenter was stable and also the production stability was good without generating fracture.

Example 2

Cellulose resin film having 80 μm film thickness and 3.0 m width was obtained in the same procedure as in Example 1 except that when the first widthwise grasping process was finished, an original film having 120 μm film thickness and 2.0 m width was produced and in the second widthwise grasping process, the widthwise draw ratio was made 1.5 times.

The obtained film had Ro of 45 nm and Rt of 135 nm, and there was no defect on the surface of the film, therefore, the film was a proper one to be used as a film for optics. Moreover, the introducing to the tenter was stable and also the production stability was good without generating fracture.

Example 3

Cellulose resin film having 60 μm film thickness and 2.2 m width was obtained in the same procedure as in Example 1 except that when the first widthwise grasping process was finished, an original film having 80 μm film thickness and 1.7 m width was produced and in the second widthwise grasping process, the widthwise draw ratio was made 1.3 times.

The obtained film had Ro of 30 nm and Rt of 120 nm, and there was no defect on the surface of the film, therefore, the film was a proper one to be used as a film for optics. Moreover, the introducing to the tenter was stable and also the production stability was good without generating fracture.

Example 4

Cellulose resin film having 60 μm film thickness and 3.0 m width was obtained in the same procedure as in Example 1 except that when the first widthwise grasping process was finished, an original film having 100 μm film thickness and 1.8 m width was produced and in the second widthwise grasping process, the widthwise draw ratio was made 1.66 times.

The obtained film had Ro of 45 nm and Rt of 133 nm, and there was no defect on the surface of the film, therefore, the film was a proper one to be used as a film for optics. Moreover, the introducing to the tenter was stable and also the production stability was good without generating fracture.

Example 5

Cellulose resin film having 80 μm film thickness and 1.7 m width was obtained in the same procedure as in Example 1 except that in the second widthwise grasping process, the widthwise draw ratio was made 1.2 times. The obtained film had Ro of 35 nm and Rt of 130 nm, and there was no defect on the surface of the film, therefore, the film was a proper one to be used as a film for optics. Moreover, the introducing to the tenter was stable and also the production stability was good without generating fracture.

Example 6

Cellulose resin film having 40 μm film thickness and 2.2 m width was obtained in the same procedure as in Example 1 except that cellulose ester having a total acyl group substitution degree of 2.4, an acetyl group substitution degree of 1.1, a propionyl group substitution degree of 1.3 was used as the cellulose ester, when the first widthwise grasping process was finished, a 1.7 m width original film (film thickness: about 55 μm) was produced, and in the second widthwise grasping process, the widthwise draw ratio was made 1.3 times. The obtained film had Ro of 50 nm and Rt of 130 nm, and there was no defect on the surface of the film, therefore, the film was a proper one to be used as a film for optics. Moreover, the introducing to the tenter was stable and also the production stability was good without generating fracture.

Comparative Example 1

Cellulose resin film was obtained in the same procedure as in Example 1 except that heat treatment applied portions by an embossing roller were not provided. In the second widthwise grasping process, fracture having split from film-grasped parts occurred frequently.

Comparative Example 2

Cellulose resin film was obtained in the same procedure as in Example 3 except that heat treatment applied portions by an embossing roller were not provided. In the second widthwise grasping process, fracture having split from film-grasped parts occurred frequently.

Comparative Example 3

Cellulose resin film was obtained in the same procedure as in Example 5 except that heat treatment applied portions by an embossing roller were not provided. In the second widthwise grasping process, fracture having split from film-grasped parts occurred. However, the frequency of the occurrence of the fracture was fewer than Comparative example 1 and Comparative example 2.

From the above mentioned matters, the effect of the present invention becomes remarkable, when the draw ratio is larger and the film width is larger. Therefore, it is desirable to perform a second widthwise grasping process for a film having a film width of 1.7 m or more after performing a heat treatment process.

Example 7

The following dope solution was prepared.

| (Preparation of dope solution) | |
|---|---|
| Cellulose ester (cellulose triacetate synthesized from linter cotton, Mn = 148,000, Mw = 310,000, Mw/Mn = 2.1, degree of acetyl substitution 2.92) | 100 parts by weight |
| Polymer X | 10 parts by weight |
| Polymer Y | 8 parts by weight |
| Silicon oxide particles (Aerosil R972V (Manufactured by Japan Aerosil)) | 0.1 parts by weight |
| Methylene chloride | 430 parts by weight |
| Ethanol | 40 parts by weight |

(Synthesis of Polymer X)

40 g of a mixture of 80 weight % of MMA and 20 weight % of HEA, 2 g of mercapto propionic acid which is a chain transfer agent and 30 g of toluene were charged to a glass flask which includes an agitator, 2 dropping funnels, a gas introducing tube and a thermometer, and the temperature was increased to 90° C. Subsequently, 60 g of a mixture of 80 weight % of MMA and 20 weight % of HEA was added by dropping over a 3-hour period through one of the dropping funnels and at the same time, 0.4 g of azobisisobutylonitryl dissolved in 14 g of toluene was added by dropping over a 3-hour period through another one of the dropping funnels. Subsequently 0.6 g of azobisisobutylonitryl dissolved in 56 g of toluene was further added by dropping over a 2-hour period and the reaction was continued for another 2 hours, and whereby polymer X was obtained. The weight average molecular weight of the polymer X was 5000 by the following measurement methods.

Here, MMA and HEA respectively are abbreviations for the following compounds.

MMA: methyl metacrylate
HEA: 2-hydroxyethyl acrylate (Measurement of Molecular Weight)

The measurement of the weight average molecular weight is done using high speed liquid chromatography.

The conditions for measurement are as follows.

Solvent: methylene chloride
Column: Shodex K806, K805, K803G (Three columns manufactured by Showa Denko K. K, are used consecutively.)
Column temperature: 25° C.
Sample concentration: 0.1 mass %
Detector: RI Model 504 (Manufactured by GL Science)
Pump: L6000 (Manufactured by Hitachi, Ltd.)
Flow rate: 1.0 ml/min
Calibration curve: Standard polystyrene STK standard polystyrene (Manufactured by Tohso) Correction calibration by 13 samples of Mw=1,000,000–500 is used. The 13 samples use substantially equal intervals.

(Synthesis of Polymer Y)

Bulk polymerization was performed using the polymerization methods described in Japanese Patent Application Laid-Open No. 2000-123911. That is, methylacrylate was charged to a flask which includes an agitator, a nitrogen gas introducing tube a thermometer and charging port, and nitrogen gas was introduced, and the thioglycerol below which is substituted with nitrogen gas in the flask was added while stirring. After addition of the thioglycerol, the temperature of the content was appropriately changed and polymerization was performed for 4 hours, and the temperature of the content was returned to room temperature, and then 20 parts by weight of a tetrahydrofuran solution with 5 mass % of benzoquinone was added and polymerization was stopped. The content was transferred to an evaporator and the tetrahydrofuran and the remaining monomer and remaining thioglycerol were removed, whereby polymer Y was obtained. The weight average molecular weight of the Polymer Y was 1000 by the above measurement method.

| | |
|---|---|
| Metacrylate or methyl metacrylate | 100 weight parts |
| Thioglycerol | 5 weight parts |

Into a pressurized closed container, the above dope solution was supplied, heated to 60° C., and stirred under the condition that the pressure in the container was made 200 kPa. Then, cellulose ester were dissolved completely while being stirred, whereby a dope solution was obtained. After the dope solution was filtered by the use of Azumi filter paper No. 244 manufactured by Azumi Filter Paper Corporation, the dope solution was cooled to 35° C. and was kept on still standing overnight, thereafter, the dope solution was subjected to a defoaming operation.

The above-mentioned dope was cast to form a film onto a stainless steel belt from a casting die. The film was dried for one minutes on the stainless steel belt which was heated to 30° C. with a temperature control to bring warm water in contact with the back surface of the stainless steel belt, thereafter, the film was kept for 10 seconds under the condition that the back surface of the stainless steel belt was made in contact with cold water of 15° C., and then the half-dry film was separated or separated from the stainless steel belt. At the time of being separated, an amount of remaining solvent in the film was 100% by weight.

Subsequently, after the separated film was dried while being conveyed for 30 seconds at 40° C., the both edges of the film were grasped by clips and introduced into the first widthwise grasping process by a tenter device shown in FIG. 3 and subjected to a transversely stretching. At this time, the temperature conditions in the tenter were set to 50° C. in a preheating zone, 110° C. in a stretching zone, 130° C. in a holding/easing zone, and 50° C. in a cooling zone. A draw ratio (stretching magnification) was made to 1.05 times. An easing operation was conducted from the holding/easing zone to the cooling zone with an easing ratio of 1%. Moreover, hot gas wind was blown on a grasping tool in a return side rail section so that the temperature of the grasping tool in a grasping starting point became 70° C.

The amount of remaining solvent in the film was about 50% by weight at the grasping starting point, about 30% by weight at the outlet of the stretching zone, and about 8% by weight at the outlet of the cooling zone.

Successively, after being released from the widthwise grasping, the film was dried for 20 minutes at 130° C. while being conveyed by rollers. Then, as shown in FIG. 4(a), an ear-cut was conducted for the both edges of the film by a slitting process, thereafter, 2 cm width heat treatment applied portions having an emboss section of 15 μm thickness were provided at positions of 50 mm distant from both edges of the film by an embossing roller heated to 250° C., whereby an original film of 104 μm thickness and 1.6 m width were produced. Subsequently, in the second widthwise grasping process by a tenter device shown in FIG. 5, the both edges of the film were widthwise grasped and subjected to a widthwise stretching under 155° C. with a draw ratio of 1.3 times, whereby a cellulose resin film of 80 μm film thickness and 2.1 m width were obtained.

The obtained film had Ro of 2 nm and Rt of −1 nm, and there was no defect on the surface of the film, therefore, the film was a proper one to be used as a film for optics. Moreover, the introducing to the tenter was stable and also the production stability was good without generating fracture.

Comparative Example 4

Cellulose resin film was obtained in the same procedure as in Example 7 except that heat treatment applied portions by an embossing roller were not provided.

In the second widthwise grasping process, fracture having split from film-grasped parts occurred frequently.

By the use of the cellulose resin film produced in Examples 1 to 7, the following antireflection film, polarizing plate, and liquid crystal display unit were produced.

(Preparation of Antireflection Film)

An antireflection layer was coated under the preparation conditions shown below by the use of the cellulose ester film prepared in Example 7, whereby the antireflection film was prepared.

<Coating of Hard Coat Layer and Back Coat Layer>

The below-mentioned hard coat layer coating solution was filtered by the use of a polypropylene filter having a pore diameter of 0.4 μm, whereby the hard coat layer coating solution was prepared, and this was coated onto the cellulose ester film prepared above, by the use of a microgravure coater. After this was dried at 90° C., the coated layer was cured with irradiation by an ultraviolet lamp in which the luminance of a irradiating section is 100 mW/cm² and the amount of irradiation is 0.1 J/cm², whereby a hard coat film on which a hard coat layer with a dry thickness of 7 μm was formed was prepared.

<Hard coat layer coating solution>
The materials below were stirred and mixed to form the hard coat layer coating solution.

| | |
|---|---|
| Acryl monomer; KAYARAD DPHA (dipentaerythritol hexaacrylate manufactured by Nippon Kayaku) | 220 parts by weight |
| Irgacure 184 (Manufactured by Chiba Specialty Chemicals) | 20 parts by weight |
| Propylene glycol monomethyl ether | 110 parts by weight |
| Ethyl acetate | 110 parts by weight |

In addition, the below-mentioned back coat layer composition was coated by an extrusion coater so as to become a wet thickness of 10 μm and then the layer was dried at 85° C. and wound, whereby the back coat layer was provided.

<Back coat layer compositions>

| | |
|---|---|
| Acetone | 54 parts by weight |
| Methylethyl ketone | 24 parts by weight |
| Methanol | 22 parts by weight |
| Diacetyl cellulose | 0.6 parts by weight |
| Ultra-fine grain silica 2% acetone dispersing solution (Aerosil 200V Manufactured by Japan Aerosil) | 0.2 parts by weight |

<Preparation of Antireflection Film>

On the hard coat film produced above, an antireflection layer was coated in the order of a high refractive index layer and then a low refractive index layer in the following ways, whereby an antireflection film was produced.

<Preparation of Antireflection Film: High Refractive Index Layer>

On the hard coat film, the below-mentioned high refractive index layer coating solution was coated by an extrusion coater, then the coated layer was dried, cured with irradiation of ultraviolet rays with 0.1 J/cm², and further cured for one minutes at 100° C., where a high refractive index layer was provided so as to have a thickness of 78 nm.

The refractive index of the high refractive index layer was 1.62.

<High refractive index layer coating compositions>

| | |
|---|---|
| Isopropyl alcohol solution of metal oxide particles (solid content 20%, ITO particle diameter 5 nm) | 55 parts by weight |
| Metal Compound: Ti(OBu)₄ (tetra n-butoxytitan) | 1.3 parts by weight |
| Ionizing radiation curable type ester: dipentaerythritol hexaacrylate | 3.2 parts by weight |
| Polymerization initiating agent Irgacure 184 (Manufactured by Chiba Specialty Chemicals) | 0.8 parts by weight |
| 10% propylene glycol monomethyl ether solution of straight chain dimethyl silicone-EO block copolymer (FZ-2207, Manufactured by Nippon Unicar Company Limited) | 1.5 parts by weight |
| Propylene glycol monomethyl ether | 120 parts by weight |
| Isopropyl alcohol | 240 parts by weight |
| Methylethyl ketone | 40 parts by weight |

(Preparation of Antireflection Layer: Low Refractive Index Layer)

The below-mentioned low refractive index layer coating compositions were coated on the high refractive index layer by the use of an extrusion coater and dried at 100° C. for 1 minute and then cured with irradiation of ultraviolet rays at 0.1 J/cm² and then further cured with heat at 120° C. for 5 minutes, whereby the low refractive index layer with a thickness of 95 nm was provided then the antireflection film was prepared. Here, the refractive index of the low refractive index layer was 1.37.

(Preparation of low refractive index layer coating compositions)
<Preparation of Tetraetoxysilane hydrolysate A>
289 g of tetraetoxysilane hydrolysate and 553 g of ethanol were admixed and the resultant was added to 157 g of 0.15% acetate solution aqueous solution and then stirred for 30 hours in a 25° C. water bath to thereby prepare the hydrolysate A.

| | |
|---|---|
| Tetraetoxysilane hydrolysate A | 110 parts by weight |
| Hollow silica particle dispersing solution | 30 parts by weight |
| KBM503 (silane coupling agent, manufactured by Shin-Etsu Chemicals) | 4 parts by weight |
| 10% propylene glycol monomethyl ether solution of straight chain dimethyl silicone-EO block copolymer (FZ-2207, Manufactured by Nippon Unicar Company Limited) | 3 parts by weight |
| Propylene glycol monomethyl ether | 400 parts by weight |
| Isopropyl alcohol | 400 parts by weight |

<Preparation of Hollow Silica Particle Dispersing Solution>

A mixture of 100 g silica sol having an average particle diameter of 5 nm and $SiO_2$ concentration of 20 mass % and 1,900 g pure water was heated to 80° C. The pH of this reaction mother liquor is 10.5, and 9,000 g of 0.98 mass % of an aqueous solution of sodium silicate which is $SiO_2$ and 9,000 g of 1.02 weight percent of an aqueous solution of sodium aluminate which is $Al_2O_3$ were added simultaneously. During this time, the temperature of the reaction solution was kept at 80° C. The pH of the reaction solution was increased to 12.5 immediately after the addition and subsequently there was little or no changes in pH. After addition, the reaction solution was cooled to room temperature and then washed by the ultrafiltration membrane to thereby prepare a $SiO_2.Al_2O_3$ core particles dispersing solution with 20 mass % of solid content concentration (Process (a)).

1,700 g of pure water are added to 500 g of the core particle solution and heated to 98° C., and 3,000 g of silicate solution ($SiO_2$, concentration 3.5 mass %) which was obtained by removing alkali the sodium silicate solution using anion exchanged ester while maintaining the temperature, and a first silica coating layer is formed and the core particles dispersing solution is thereby obtained. (Process (b)).

Next, 1,125 g of pure water was added to 500 g of the core particle dispersing solution which form the first silica coating layer which was washed at the ultrafiltration membrane to have a solid content concentration of 13 mass %, and then concentrated hydrochloric acid (35.5%) was added by dropping to make the pH 1.0 and the aluminum removal process was performed. Next, the dissolved aluminum salt at the ultrafiltration membrane was separated while adding 10 L of an aqueous solution of hydrochloric acid having a pH of 3 and 5 L of water. The $SiO_2.Al_2O_3$ porous particle dispersing solution from which a portion of structural components of the core particles forming the first silica coating layer is removed, is prepared (Process (c)).

A mixture of 1,500 g of the porous particle dispersing solution, 500 g of pure water, 1,750 g ethanol and 626 g of 28' ammonia water were heated to 35° C. and then 104 g of ethyl silicate ($SiO_2$ 28 mass %) were added and the surface of the porous particles on which the first silica coating layer is formed was coated with hydrolysis and condensation product of ethyl silicate and the second silica coating layer was thereby formed. Next, a hollow silica particle dispersing solution having 20 mass % solid content concentration in which the solvent was substituted with ethanol was prepared using the ultrafiltration membrane.

The thickness of the first silica coating layer of hollow silica particles is 3 nm, the average particle diameter is 47 nm, $MOx/SiO_2$ (mole ratio) is 0.0017, and the refractive index is 1.28. Here, the average particle diameter is measured by a dynamic light dispersion method.

(Reflectance)

The spectral reflectivity of the antireflection film that was prepared was measured at an angle of incidence of 5' in the 380-780 nm wavelength region, using a spectrometer (U-4000 manufactured by Hitachi). Because the antireflection function is good to the extent that the reflectance is small over a wide wavelength region, the lowest reflectance is obtained in the 450-650 nm range from the measured values. The measurement is done by subjecting the back surface of the viewing side to roughening treatment and then performing light absorption using black spray and preventing reflectance of light on the film back surface and then measuring the reflectance.

As a result, the antireflection film A1 has a reflectance of 0.4%.

(Preparation of the Polarizing Plate)

A 120 μm thick polyvinyl alcohol film was immersed in 100 parts by weight of an aqueous solution containing 1 parts by weight of iodine and 4 parts by weight of boric acid, stretched 4 times at 50° C., whereby a wider polarization film was produced.

Subsequently, in accordance with the following processes 1 to 5, a polarizing film and the antireflection films produced by the use of the cellulose resin films produced in Example 1 to 6 and the cellulose resin film produced in Example 7 were pasted to each other with 5% complete saponification type polyvinyl alcohol aqueous solution as adhesive.

Process 1: The cellulose resin films were immersed for 60 seconds in a 50° C. 1 mol/L sodium hydroxide solution and then washed and dried, the cellulose resin films whose side to which the polarizing film is to be pasted was saponified, were obtained.

Process 2: The polarizing film was immersed in solid content 2 weight % polyvinyl alcohol adhesive tank for 1 to 2 seconds.

Process 3: Excess adhesive which attached to the polarizing film in Process 2 was gently wiped off and then the polarizing film was placed on the cellulose resin films processed in Process 1, further laminated and arranged such that the antireflection film was placed at the outside.

Process 4: The cellulose resin films produced in Examples 1 to 7, the polarizing film and the antireflection film which were stacked in Process 3 were pasted together at a pressure of 20-30 $N/cm^2$ and a conveyance speed of approximately 2 m/minute.

Process 5: The samples prepared in Process 4 were dried for 2 minutes in a dryer at 80° C., whereby the polarizing plates 1 to 7 were prepared. There was no fracture failure at the time of polarizing plate production in the polarizing plates 1 to 7. Therefore the productivity was good.

The produced polarizing plates 1 to 7 were pasted to a 80 type VA mode liquid crystal cell such that the surface provided with the antireflection layer of the polarizing plate became at the outside, whereby the liquid crystal displays were produced. Then, visibility was evaluated for these liquid crystal displays, and the effects that a view angle was large, there was little waving unevenness, and eyes did not get tired under long observation, were recognized.

The invention claimed is:

1. A cellulose resin film producing method, comprising in the following order:
    a casting process of casting a liquid state cellulose resin on a support to form a web;
    a separating process of separating the web from the support;
    a first widthwise grasping process of grasping both edges of the web in the width direction of the web, stretching the web with a widthwise stretching ratio of 0.95 to 1.5 times in the width direction of the web, and drying the web while grasping widthwise the both edges of the web;
    a releasing process of releasing the both edges of the web from the widthwise grasping;
    a heat treatment process of applying a heat treatment onto only the both edges of the web with an embossing roller in such a way that the embossing roller is heated higher than a glass transition point (Tg) of the cellulose resin and is brought in pressure contact with only the both edges of the web so as to harden the both edges; and
    a second widthwise grasping process of grasping widthwise the both edges of the web and stretching again the web with a widthwise stretching ratio of 1.2 to 2.0 times in the width direction of the web while grasping widthwise the both edges of the web.

2. The cellulose resin film producing method described in claim 1, further comprising:
    a slitting process of slitting the both edges of the web after the first widthwise grasping process before the heat treatment process.

3. The cellulose resin film producing method described in claim 1, wherein in the second widthwise grasping process, inner portions adjacent to respective heat treatment-applied sections on the both edges of the web are grasped by a grasping member.

4. The cellulose resin film producing method described in claim 1, further comprising:
    a drying process between the first widthwise grasping process and the second widthwise grasping process.

5. The cellulose resin film producing method described in claim 1, wherein the widthwise stretching ratio in the first widthwise grasping process is 0.95 to 1.10 times and the widthwise stretching ratio in the second widthwise grasping process is 1.2 to 1.5 times.

6. The cellulose resin film producing method described in claim 1, further comprising;
    a wind-up process of winding up the web after the heat treatment process,
    wherein in the second widthwise grasping process, the web wound up in the wind-up process is wound off and then the both edges of the web are widthwise grasped.

7. The cellulose resin film producing method described in claim 1, wherein a cellulose resin film having a width of 1.7 m to 4.0 m is produced from the web after the second widthwise grasping process.

8. The cellulose resin film producing method described in claim 7, wherein the cellulose resin film having a width of 1.95 m to 3.0 m is produced.

9. The cellulose resin film producing method described in claim 7, wherein the thickness of the cellulose resin film is 10 μm to 60 μm.

10. The cellulose resin film producing method described in claim 1, wherein each of the both edges of the web applied with the heat treatment is provided with a convexo-concave-shaped band by the embossing roller.

11. The cellulose resin film producing method described in claim 1, wherein each of the both edges of the web applied with the heat treatment has a thickness thicker by from 5 μm to 30 μm than the thickness of the web.

* * * * *